United States Patent
Brantley et al.

(10) Patent No.: US 7,807,312 B2
(45) Date of Patent: Oct. 5, 2010

(54) PORTABLE ELECTRICAL ENERGY GENERATION EQUIPMENT

(75) Inventors: Jennifer E. Brantley, Dublin, CA (US); Ian W. Kaye, Livermore, CA (US); Kenneth J. Newell, Livermore, CA (US)

(73) Assignee: Ultracell Corporation, Livermore, CA (US)

( * ) Notice: Subject to any disclaimer, the term of this patent is extended or adjusted under 35 U.S.C. 154(b) by 884 days.

(21) Appl. No.: 11/621,897

(22) Filed: Jan. 10, 2007

(65) Prior Publication Data

US 2007/0178361 A1    Aug. 2, 2007

Related U.S. Application Data

(60) Provisional application No. 60/758,709, filed on Jan. 12, 2006.

(51) Int. Cl.
*H01M 8/24* (2006.01)
*H01M 8/10* (2006.01)
*H01M 8/02* (2006.01)

(52) U.S. Cl. .................. 429/457; 429/469; 429/511

(58) Field of Classification Search .......... 429/34, 429/35, 36, 37, 38, 39
See application file for complete search history.

(56) References Cited

U.S. PATENT DOCUMENTS

| 5,798,188 | A | 8/1998 | Mukohyama |
| 6,677,071 | B2 | 1/2004 | Yang |
| 2002/0022170 | A1* | 2/2002 | Franklin et al. ............... 429/34 |
| 2003/0175575 | A1* | 9/2003 | Zuber et al. ................... 429/35 |
| 2004/0175608 | A1 | 9/2004 | Lisi et al. |
| 2005/0003260 | A1 | 1/2005 | Hatoh et al. |
| 2005/0008911 | A1 | 1/2005 | Kaye |
| 2005/0014059 | A1 | 1/2005 | Kaye |
| 2005/0202303 | A1* | 9/2005 | Schlag .......................... 429/36 |
| 2006/0068265 | A1* | 3/2006 | Hanlon et al. ................. 429/38 |
| 2006/0134470 | A1 | 6/2006 | Kaye et al. |

OTHER PUBLICATIONS

Branson Ultrasonics, Brochure from Branson on Ultrasonic Welding, Feb. 2003.
Dai Nippon Printing Co., Ltd., DNP Fuel Cell Components Catalog, Feb. 2, 2006.
International Search Report dated May 1, 2008 from Application No. PCT/US2007/00937.
Written Opinion dated May 1, 2008 from Application No. PCT/US2007/00937.

* cited by examiner

*Primary Examiner*—Dah-Wei D Yuan
*Assistant Examiner*—Stephen Essex
(74) *Attorney, Agent, or Firm*—Beyer Law Group LLP

(57) ABSTRACT

The invention relates to a portable electrical energy generator, its components, and manufacture of the components and generator. The generator includes a bi-polar plate stack, which is well suited for use in a fuel cell. The stack may include at least one spacer that limits compression of a membrane electrode assembly in the fuel cell. The stack may also include a polymer binder that holds the stack together and/or maintains a compression force on the membrane electrode assembly. An open cathode manifold may also provided to ease oxygen movement. High throughput and low cost manufacture of bi-polar plates is also described herein.

30 Claims, 13 Drawing Sheets

PORTABLE ELECTRICAL ENERGY GENERATION EQUIPMENT

CROSS-REFERENCE TO RELATED APPLICATIONS

This application claims priority under 35 U.S.C. §119(e) to U.S. Provisional Patent Application No. 60/758,709, filed on Jan. 12, 2006 and entitled "FUEL CELL BI-POLAR PLATE MANUFACTURING", which is incorporated by reference in its entirety for all purposes.

BACKGROUND OF THE INVENTION

The present invention relates to the manufacture of portable electrical energy generation equipment. In particular, the invention relates to design and manufacture of portable fuel cells and portable fuel cell components.

A fuel cell electrochemically combines hydrogen and oxygen to produce electricity. To date, fuel cells are only commercially available in large-scale applications such as automobiles and industrial size generators for electrical power back up. Consumer electronics devices and other portable electrical power applications currently rely on lithium ion and similar battery technologies. Fuel cell systems that generate electrical energy for portable applications such as electronics offer extended usage sessions, would be desirable, but are still in development and not yet commercially available.

Portable fuel cells are currently encountering difficulties transitioning from lab prototypes to consumer ready products. Manufacturing realities—such as cost, product reliably, and manufacturing precision and repeatability—are obstructing the evolution of portable fuel cells into viable commercial products. Portable fuel cell designs and manufacturing techniques that promote reliable and cost effective mass production of fuel cells, and their components, would be beneficial.

SUMMARY OF THE INVENTION

The present invention relates to a portable electrical energy generator, its components, and manufacture of the components and generator. The generator includes a bi-polar plate stack, which is well suited for use in a fuel cell. The stack may include at least one spacer that limits compression of a membrane electrode assembly in the fuel cell. The stack may also include a polymer binder that holds the stack together and/or maintains a compression force on the membrane electrode assembly. An open cathode manifold may also provided to ease oxygen movement. High throughput and low cost manufacture of bi-polar plates is also described herein.

In one aspect, the present invention relates to a stack for use in an electrical energy generator. The stack includes a first bi-polar plate and a second bi-polar plate. The first bi-polar plate includes a) a substrate, and b) a channel field formed into the substrate and located in a central portion of the bi-polar plate. The second bi-polar plate includes a) a substrate, and b) a second channel field formed into the second bi-polar plate substrate and located in a central portion of the second bi-polar plate. The stack also includes at least one spacer attached to perimeter portion of the first bi-polar plate and attached to perimeter portion of the second bi-polar plate. The at least one spacer is configured to form a socket between the first bi-polar plate and the second bi-polar plate. The stack further includes a membrane electrode assembly disposed in the socket.

In another aspect, the present invention relates to a method of manufacturing a stack for use in portable electrical energy generator. The method includes receiving a first bi-polar plate and a second bi-polar plate. The method also includes attaching at least one spacer to the first bi-polar plate and the second bi-polar plate to form a socket between the first bi-polar plate and the second bi-polar plate. The method further includes disposing a membrane electrode assembly within the socket. The method additionally includes compressing the membrane electrode assembly. The method also includes limiting compression of the membrane electrode assembly using the at least one spacer.

In yet another aspect, the present invention relates to a stack that includes a first bi-polar plate, a second bi-polar plate, and a membrane electrode assembly disposed between the first bi-polar plate and the second bi-polar plate. The stack also includes at least one polymer element configured to attach the first bi-polar plate to the second bi-polar plate and to maintain a compression force on the membrane electrode assembly.

In still another aspect, the present invention relates to a stack including multiple bi-polar plates that each has a cathode channel field formed into the bi-polar plate. The stack also includes an open cathode manifold configured to open between the cathode channel field and an environment around the stack.

In another aspect, the present invention relates to a stack. The stack includes a first bi-polar plate including a) a substrate, and b) an anode channel field formed into a first face of the substrate and located in a central portion of the bi-polar plate, and c) a cathode channel field formed into a second face of the substrate and located in a central portion of the bi-polar plate. The stack also includes a second bi-polar plate including a) a substrate, and b) a an anode channel field formed into the second bi-polar plate substrate and located in a central portion of the second bi-polar plate. The stack further includes a third bi-polar plate including a) a substrate, and b) a cathode channel field formed into the third bi-polar plate substrate and located in a central portion of the third bi-polar plate. The stack additionally includes at least one spacer attached to perimeter portion of the second face of the first bi-polar plate and attached to perimeter portion of the second bi-polar plate, wherein the at least one spacer is configured to form a first socket between the first bi-polar plate and the second bi-polar plate. The stack also includes at least one spacer attached to perimeter portion of the first face of the first bi-polar plate, and attached to perimeter portion of the third bi-polar plate, wherein the at least one spacer in the between the first bi-polar plate and the third bi-polar plate is configured to form a second socket between the first bi-polar plate and the third bi-polar plate. The stack further includes a membrane electrode assembly disposed in the first socket and a membrane electrode assembly disposed in the first socket.

In another aspect, the present invention relates to a stack. The stack includes a first bi-polar plate including a) a first sheet with a first bi-polar plate channel field formed through the first sheet and b) a second sheet attached to the first sheet and including a second channel field formed through the second sheet. The stack also includes a second bi-polar plate including a) a third sheet with a third bi-polar plate channel field formed through the third sheet and b) a fourth sheet attached to the fourth sheet and including a fourth channel field formed through the fourth sheet.

These and other features of the present invention will be described in the following description of the invention and associated figures.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1A:
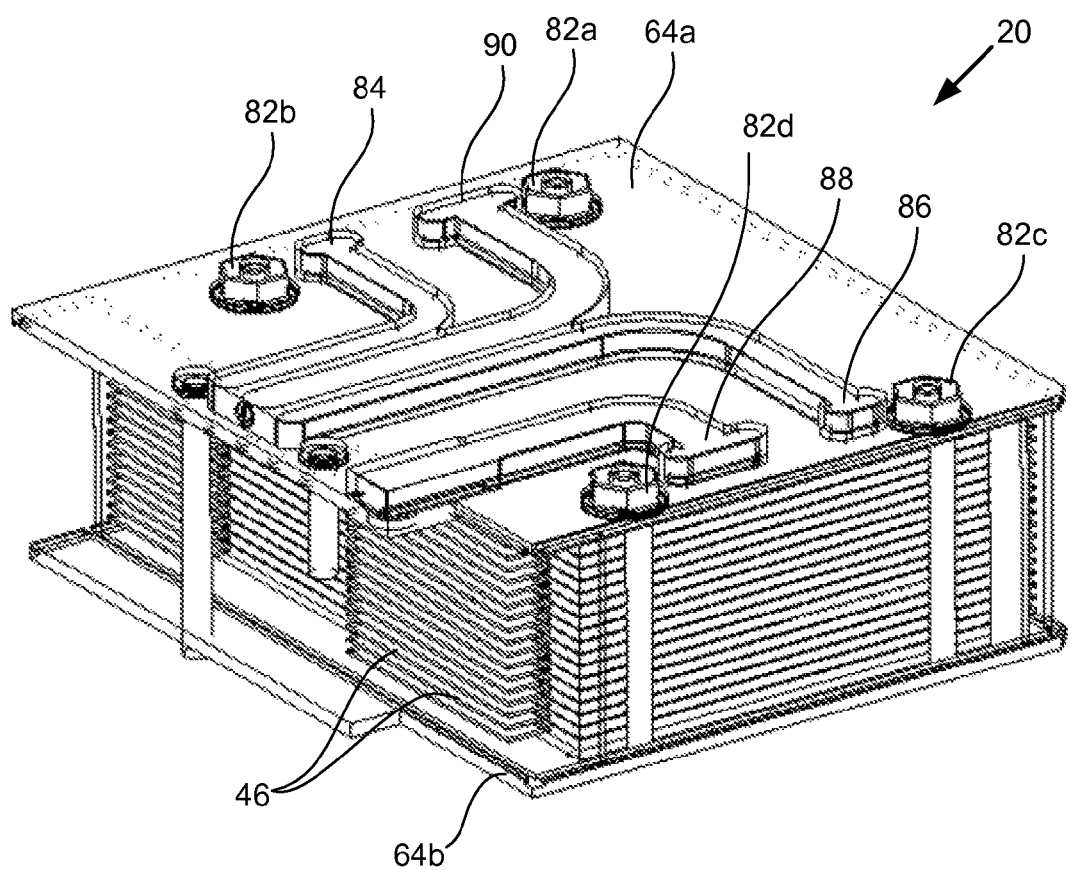
FIG. 1A illustrates an outer top perspective view of a fuel cell in accordance with a specific embodiment of the present invention.
Figure 1B:
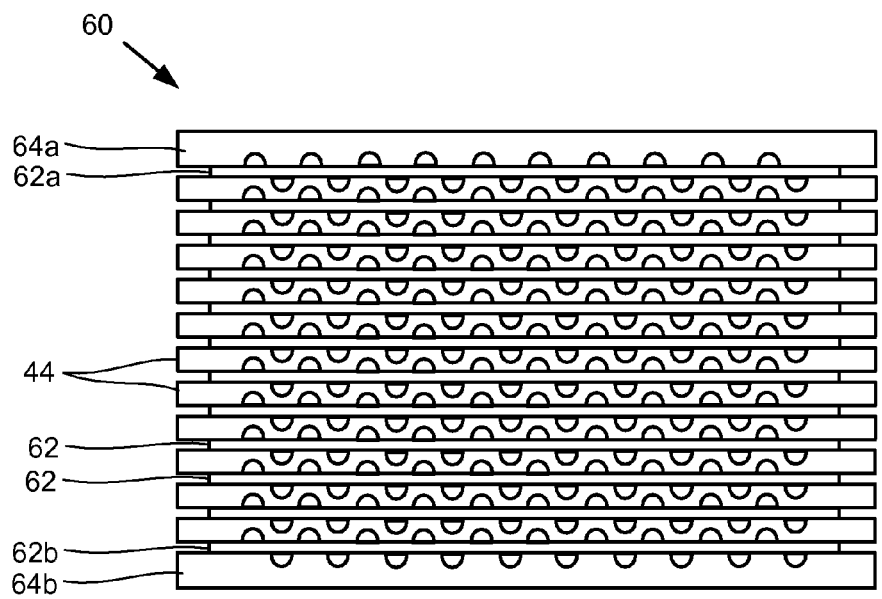
FIG. 1B illustrates a simplified cross sectional view of a fuel cell stack used in the fuel cell of FIG. 1A in accordance with one embodiment of the present invention.
Figure 1C:
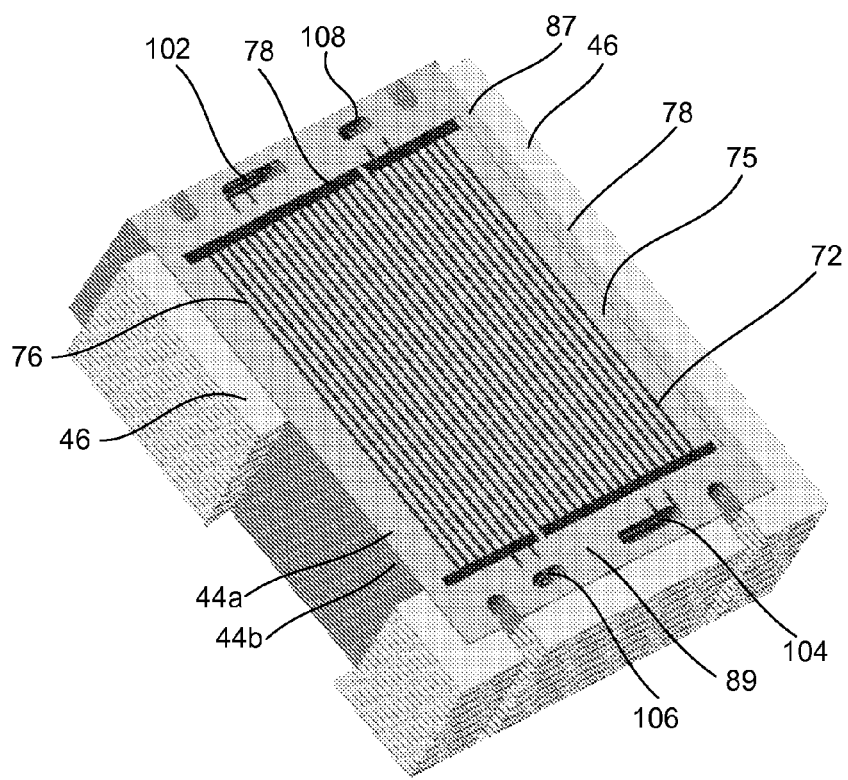
FIG. 1C illustrates a top perspective view of a stack of bi-polar plates in accordance with another specific embodiment of the present invention.

FIGS. 1A-1C show a fuel cell 20 in accordance with specific embodiments of the present invention.

Referring first to FIG. 1A, fuel cell 20 electrochemically converts hydrogen and oxygen to water, generating electrical energy (and sometimes heat) in the process. Ambient air readily supplies oxygen. A pure or direct oxygen source may also be used.

Hydrogen provision uses a working supply. The hydrogen supply may include a direct hydrogen supply or hydrogen from a reformed fuel supply. A direct hydrogen supply employs a pure source, such as compressed hydrogen in a pressurized container, or a solid-hydrogen storage system, such as a metal-based hydrogen storage device. A reformed hydrogen supply processes a fuel to produce hydrogen. The fuel acts as a hydrogen carrier, is manipulated to separate hydrogen, and may include a hydrocarbon fuel, hydrogen bearing fuel stream, or any other hydrogen fuel such as ammonia. One suitable reformed fuel cell system is described below with respect to FIG. 11. Current popular hydrocarbon fuels include methanol, ethanol, gasoline, propane and natural gas. Liquid fuels offer high energy densities and the ability to be readily stored and transported. The water often forms as a vapor, depending on the temperature of fuel cell 20. For some fuel cells, the electrochemical reaction may also produce carbon dioxide as a byproduct.

Several fuel cell classes are suitable for use herein. In one embodiment, fuel cell 20 is a reformed methanol fuel cell (RMFC). The present invention may also apply to a solid oxide fuel cell (SOFC), a phosphoric acid fuel cell (PAFC), a direct methanol fuel cell (DMFC), or a direct ethanol fuel cell (DEFC). Fuel cell 20 includes components specific to each architecture, as one of skill in the art will appreciate. A DMFC or DEFC receives and processes a fuel. More specifically, a DMFC or DEFC receives liquid methanol or ethanol, respectively, channels the fuel into the fuel cell stack and processes the liquid fuel to separate hydrogen for electrical energy generation. For a DMFC, channel fields in the bi-polar plates distribute liquid methanol instead of hydrogen. The hydrogen catalyst then includes a suitable anode catalyst for separating hydrogen from methanol. The oxygen catalyst includes a suitable cathode catalyst for processing oxygen or another suitable oxidant used in the DMFC, such as peroxide. In general, the hydrogen catalyst is also commonly referred to as an anode catalyst in other fuel cell architectures and may comprise any suitable catalyst that removes hydrogen for electrical energy generation in a fuel cell, such as directly from the fuel as in a DMFC. In general, the oxygen catalyst may include any catalyst that processes an oxidant in used in fuel cell 20. The oxidant may include any liquid or gas that oxidizes the fuel and is not limited to oxygen gas as described above. An SOFC, PAFC or MCFC may also benefit from inventions described herein, for example. In this case, fuel cell 20 comprises an anode catalyst, cathode catalyst, anode fuel and oxidant according to a specific SOFC, PAFC or MCFC design.

Fuel cell 20 is well suited for use with micro fuel cell systems. A micro fuel cell generates dc voltage, and may be used in a wide variety of applications. For example, electrical energy generated by a micro fuel cell may power a notebook computer or a portable electrical generator carried by military personnel. In one embodiment, the present invention provides 'small' fuel cells that are configured to output less than 200 watts of power (net or total). Fuel cells of this size are commonly referred to as 'micro fuel cells' and are well suited for use with portable electronics devices. In one embodiment, the fuel cell is configured to generate from about 1 milliwatt to about 200 Watts. In another embodiment, the fuel cell generates from about 5 Watts to about 60 Watts. The fuel cell system may be a stand-alone system, which is a single package that produces power as long as it has access to a) oxygen and b) hydrogen or a hydrogen source such as a hydrocarbon fuel. One specific portable fuel cell package produces about 20 Watts or about 45 Watts, depending on the number of cells in the stack.

Fuel cell 20 includes a fuel cell stack 60. Referring to FIG. 1B, fuel cell stack 60 includes a set of bi-polar plates 44 and a set of membrane electrode assembly (MEA) layers 62. Two MEA layers 62 neighbor each bi-polar plate 44. With the exception of topmost and bottommost membrane electrode assembly layers 62a and 62b, each MEA 62 is disposed between two adjacent bi-polar plates 44. For MEAs 62a and 62b, top and bottom end plates 64a and 64b include a channel field (a set of channels on a surface) on the face neighboring an MEA 62.

In one embodiment, each bi-polar plate 44 is formed from one or more substantially flat plates and includes channel fields on opposite surfaces of the bi-polar plate. Thickness for each bi-polar plate is typically less than about 5 millimeters, and compact fuel cells for portable applications may employ bi-polar plates thinner than about 2 millimeters. In a specific embodiment, each bi-polar plate 44 includes multiple layers that include more than one sheet of metal. Several suitable bi-polar plate designs are described below.

Collectively, in stack 60, bi-polar plates 44 distribute hydrogen and oxygen in stack 60. Gaseous hydrogen distribution to the hydrogen gas distribution layer in the MEA occurs via a hydrogen channel field on a bi-polar plate, while oxygen distribution to the oxygen gas distribution layer in the MEA occurs via an oxygen channel field. In one embodiment, a single bi-polar plate dually distributes hydrogen and oxygen: one channel field distributes hydrogen while a channel field on the opposite face of the bi-polar plate 44 distributes oxygen. In another embodiment, a single bi-polar plate only distributes hydrogen or oxygen and the adjacent MEAs are oriented accordingly.

In electrical terms, the anode includes the hydrogen gas distribution layer, hydrogen catalyst and a bi-polar plate. The anode acts as the negative electrode for fuel cell 20 and conducts electrons that are freed from hydrogen molecules so that they can be used externally, e.g., to power an external circuit or stored in a battery. In electrical terms, the cathode includes the oxygen gas distribution layer, oxygen catalyst and an adjacent bi-polar plate. The cathode represents the positive electrode for fuel cell 20 and conducts the electrons back from the external electrical circuit to the oxygen catalyst, where they can recombine with hydrogen ions and oxygen to form water.

In fuel cell stack 60, the assembled bi-polar plates 44 are connected in series to add electrical potential gained in each layer of the stack. The term 'bi-polar' refers electrically to a bi-polar plate (whether mechanically comprised of one plate or multiple pieces and/or plates) sandwiched between two membrane electrode assembly 62 layers. In a stack where plates 44 are connected in series, a bi-polar plate 44 may act as both a negative terminal for one adjacent (e.g., above) membrane electrode assembly and a positive terminal for a second adjacent (e.g., below) membrane electrode assembly arranged on the opposite surface of the bi-polar plate.

The number of bi-polar plates 44 and MEA layers 62 in each set may vary with design of fuel cell stack 60. Stacking parallel layers in fuel cell stack 60 permits efficient use of space and increased power density for fuel cell 20 and a fuel cell package including fuel cell 20. In one embodiment, each membrane electrode assembly 62 produces 0.7 V and the number of MEA layers 62 and bi-polar plates 44 are selected to achieve a desired voltage. Fuel cell 20 size and layout may also be tailored and configured to output a given power.

While the present invention will mainly be discussed with respect to PEM fuel cells, it is understood that the present invention may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Other suitable fuel cell architectures include alkaline and molten carbonate fuel cells, for example.

In a PEM fuel cell, the hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder thinly coated onto a carbon paper or cloth. Many designs employ a rough and porous catalyst to increase surface area of the platinum exposed to the hydrogen and oxygen.

For product and reactant communication, fuel cell 20 includes one or more intake and outlet manifolds that communicate gases with the bi-polar plates 44. Each manifold delivers a product or reactant gas to or from the fuel cell stack 60. More specifically, each manifold delivers a gas between a vertical manifold created by stacking bi-polar plates 44 (FIG. 1C) and plumbing external to fuel cell 20.

As shown in FIG. 1A, fuel cell 20 includes two anode manifolds 84 and 86. Inlet hydrogen manifold 84 is disposed on top end plate 64a, couples to an inlet line or conduit to receive hydrogen gas, and opens to an inlet hydrogen manifold 102 (FIG. 1C) that is configured to deliver inlet hydrogen gas to a channel field 72 on each bi-polar plate 44 in stack 60. Outlet manifold 86 receives outlet gases from an anode exhaust manifold 104 (FIG. 1C) that is configured to collect waste products from the anode channel fields 72 of each bi-polar plate 44. Outlet manifold 86 may provide the exhaust gases to the ambient space about the fuel cell. In another embodiment, manifold 86 provides the anode exhaust to a line that transports the unused hydrogen back to a fuel processor.

Fuel cell 20 includes two cathode manifolds: an inlet cathode manifold or inlet oxygen manifold 88, and an outlet cathode manifold or outlet water/vapor manifold 90. Inlet oxygen manifold 88 is disposed on top end plate 64a, couples with an inlet conduit to receive ambient air, and opens to an oxygen manifold 106 (FIG. 1C) that is configured to deliver inlet oxygen and ambient air to a channel field 72 on each bi-polar plate 44 in stack 60. In another embodiment, fuel cell 20 does not include inlet oxygen manifold 88 but instead includes an open cathode manifold that eases fuel cell system oxygen movement. Outlet water/vapor manifold 90 receives outlet gases from a cathode exhaust manifold 108 (FIG. 1C)

that is configured to collect water (typically as a vapor) from the cathode channel fields 72 on each bi-polar plate 44.

As shown in FIG. 1A, manifolds 84, 86, 88 and 90 include molded channels that each travel along a top surface of end plate 64a from their interface from outside the fuel cell to a manifold in the stack. Each manifold or channel acts as a gaseous communication line for fuel cell 20 and may comprise a molded channel in plate 64 or a housing of fuel cell 20. Other arrangements to communicate gases to and from stack 60 are contemplated, such as those that do not share common manifolding in a single plate or structure.

Referring to FIG. 1B, top and bottom end plates 64a and 64b provide mechanical protection for stack 60. End plates 64 also hold the bi-polar plates 44 and MEA layers 62 together, and apply pressure across the planar area of each bi-polar plate 44 and each MEA 62. End plates 64 may include steel or another suitably stiff material. Bolts 82a-d connect and secure top and bottom end plates 64a and 64b together. In another embodiment (FIG. 8), stack 60 includes polymer elements that hold the stack together and maintain pressure across the planar area of each bi-polar plate 44 and each MEA 62.

FIG. 1C illustrates a top perspective view of a stack of bi-polar plates (with the top two plates labeled 44a and 44b) in accordance with one embodiment of the present invention. Bi-polar plate 44a is a single substantially flat plate with channel fields 72 carved into on opposite faces 75 of the plate 44.

Functionally, bi-polar plate 44 a) delivers and distributes reactant gases to the gas diffusion layers and their respective catalysts, b) maintains separation of the reactant gasses from one another between MEA layers 62 in stack 60, c) exhausts electrochemical reaction byproducts from MEA layers 62, and d) includes gas intake and gas exhaust manifolds for gas delivery to other bi-polar plates 44 in the fuel stack 60.

Figure 2:
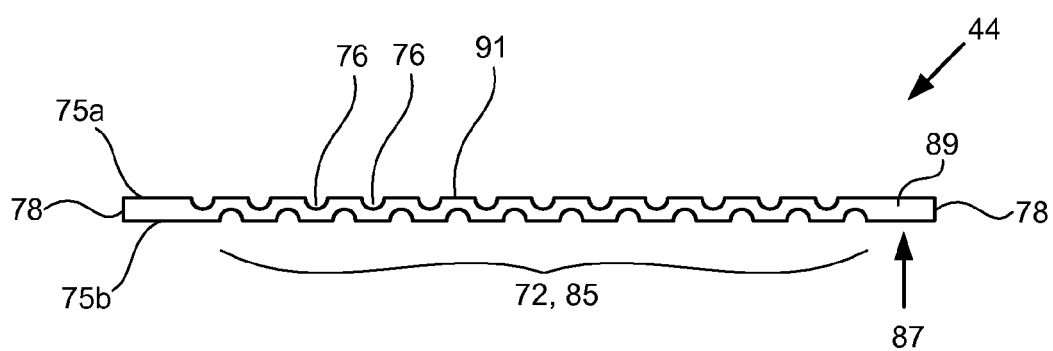
FIG. 2 shows a bi-polar plate in accordance with one embodiment of the present invention.

FIG. 2 shows a bi-polar plate 44 in accordance with one embodiment of the present invention. Bi-polar plate 44 includes a substantially flat profile with top and bottom opposing faces 75a and 75b and a channel field 72 or "flow field" on each opposing face.

Structurally, bi-polar plate 44 has a substantially flat profile and includes opposing top and bottom faces 75a and 75b and a number of sides 78. Faces 75 are substantially planar with the exception of channels 76 formed as troughs into substrate 89. Sides 78 comprise portions of bi-polar plate 44 proximate to edges of bi-polar plate 44 between the two faces 75. As shown in FIGS. 1C and 3B, bi-polar plate 44 is roughly quadrilateral.

Bi-polar plate 44 includes a channel field 72 or "flow field" on each face of plate 44. Each channel field 72 includes one or more channels 76 formed into the substrate 89 of plate 44 such that the channel rests below a surface 91 on each face 75 of plate 44. Each channel field 72 distributes one or more reactant gasses to an active area for the fuel cell stack 60. Bi-polar plate 44 includes an anode channel field 72a on the anode face 75a of bi-polar plate 44 that distributes hydrogen, while a cathode channel field on opposite cathode face 75b distributes oxygen. For fuel cell stack 60, each channel field 72 is configured to receive a reactant gas from an intake manifold 102 or 106 and configured to distribute the reactant gas to a gas diffusion layer in the MEA. Each channel field 72 also collects reaction byproducts for exhaust from fuel cell 20. When bi-polar plates 44 are stacked together in fuel cell 60, adjacent plates 44 sandwich an MEA layer 62 such that the anode face 75a from one bi-polar plate 44 neighbors a cathode face 75b of an adjacent bi-polar plate 44 on an opposite side of an MEA layer 62.

From a top or bottom perspective, each plate has a central portion 85 (FIG. 2) and a perimeter portion 87 (FIGS. 1C and 2). Central portions of bi-polar plate 44 include substantially planar portions of a bi-polar plate that include a channel 76 or channel field 72, or portions that are generally away from the sides 78 of plate 44. Perimeter portions 87 of bi-polar plate 44 include any portions of plate 44 proximate to a side 78 or edge of the substrate included in plate 44. External portions of bi-polar plate 44 often do not include a channel field 72.

Substrate 89 refers to the material used in bi-polar plate 44. Suitable materials for used in bi-polar plate 44 include: a metal (stainless steel, copper, aluminum, titanium, etc.), graphite, polymer (filled or unfilled), ceramic, or a composite of these materials. Although bi-polar plate 44 is shown with one substrate, bi-polar plates of the present invention may include multiple substrates and materials (e.g., see FIG. 5).

One or more coatings may also be applied onto substrate 89 to improve chemical resistance and/or electrical conductance. To prevent corrosion, a metal may be coated with a protective coating such as gold, silver, niobium, etc. Other suitable coatings include PEMCOAT FC7 as provided by Ineos Technologies of Cheshire, UK on a stainless steel base-plate material; a copper sheet with clad stainless steel on each side may be coated with PEMCOAT FC7.

In one embodiment, a bi-polar plate 44 is considered 'flat' when surface 91 is about the same thickness in the central portion 85 (e.g., between channels 76 in field 72) as the perimeter portions 87. In other words, the surface 75a to surface 75b thickness of plate 44 is consistent between central portion 85 and perimeter portions 87.

The manifold on each plate 44 is configured to deliver a gas to a channel field on a face of the plate 44 or receive a gas from the channel field 72. The manifolds for bi-polar plate 44 include apertures or holes in substrate 89 that, when combined with manifolds of other plates 44 in a stack 60, form an inter-plate 44 gaseous communication manifold (such as 102, 104, 106 and 108). Thus, when plates 44 are stacked and their manifolds substantially align, the manifolds permit gaseous delivery to and from each plate 44.

In one embodiment, bi-polar plates 44 in stack 60 each include one or more heat transfer appendages 46 (FIG. 1C). Each heat transfer appendages 46 provides conductive heat transfer between external and internal portions of a fuel cell stack, which permits external thermal management of internal portions of fuel cell stack 60. More specifically, appendage 46 may be used to heat or cool internal portions of fuel cell stack 60 such as internal portions of each attached bi-polar plate 44 and any neighboring MEA layers 62. Heat transfer appendage 46 is laterally arranged outside channel field 72. In one embodiment, appendage 46 is disposed on a perimeter portion 87 of bi-polar plate 44.

Peripherally disposing heat transfer appendage 46 allows heat transfer between inner portions of plate 44 and the externally disposed appendage 46 via the plate substrate 89. In one embodiment, heat transfer appendage 46 is integral with substrate material 89 in plate 44. Integral in this sense refers to material continuity between appendage 46 and plate 44. Heat may travel to or from the heat transfer appendage 46. In other words, appendage 46 may be employed as a heat sink or source. Thus, heat transfer appendage 46 may be used as a heat sink to cool internal portions of bi-polar plate 44 or an MEA 62.

Figure 3A:
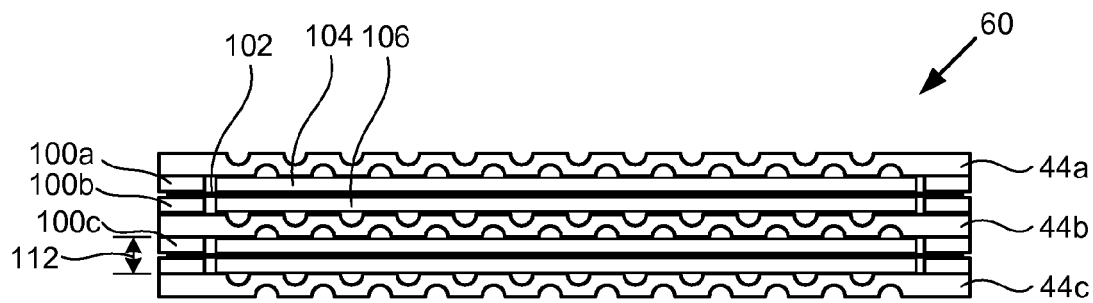
FIG. 3A shows a fuel cell stack in accordance with another embodiment of the present invention.
Figure 3B:
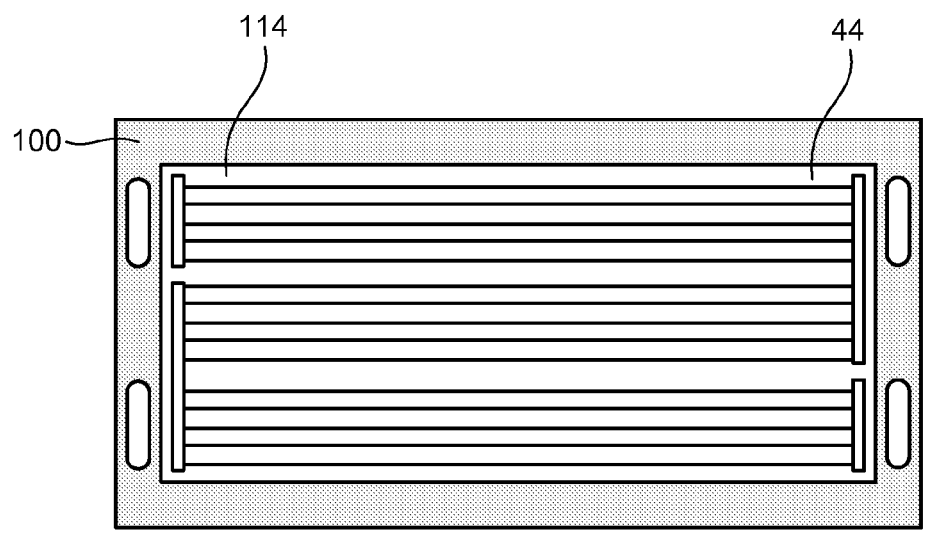
FIG. 3B shows a top view of a bi-polar plate with attached spacers in accordance with a specific embodiment of the present invention.

FIG. 3A shows a fuel cell stack 60 in accordance with another embodiment of the present invention. Stack 60 includes spacers 100 that separate adjacent bi-polar plates 44 in the stack. FIG. 3B shows a top view of a spacer 100 and bi-polar plate 44 in accordance with a specific embodiment of the present invention.

In this case, MEA 62 includes a kapton layer 102 that separates a cathode diffusion layer 104 and an anode diffusion layer 106. In one embodiment, fuel cell 20 is a low volume ion conductive membrane (PEM) fuel cell suitable for use with portable applications such as consumer electronics. A PEM fuel cell comprises an MEA 62 that carries out the electrical energy generating an electrochemical reaction. The PEM MEA 62 includes a hydrogen catalyst, an oxygen catalyst, and an ion conductive membrane 102 that a) selectively conducts protons and b) electrically isolates the hydrogen catalyst from the oxygen catalyst. Anode diffusion layer 106 contains the hydrogen catalyst and allows the diffusion of hydrogen therethrough. Cathode diffusion layer 104 contains the oxygen catalyst and allows the diffusion of oxygen and hydrogen protons therethrough. Typically, the ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst. In a specific embodiment, MEA 62 includes a model number P1000 or P2000 available from PEMEAS of Frankfurt, Germany. Other MEAs are also suitable for use herein.

A membrane electrode assembly is often compliant. Under-compression of MEA 62 may lead to performance degradation of the membrane electrode assembly; over-compression of MEA 62 may lead to MEA damage. In one embodiment, fuel cell 20 includes one or more spacers that contain MEA 62 compression within a desired range.

Spacers 100*a* and 100*b* are configured to maintain a socket 110 between bi-polar plates 44*a* and 44*b*. Socket 110 refers to a volume between bi-polar plates 44*a* and 44*b*. In this case, socket 100 is defined by depth 112 (FIG. 3A) and planar area 114 (FIG. 3B). Spacers 100 also resemble a frame when viewed from the top in FIG. 3B. Socket 110 is sized to receive MEA 62.

Kapton layer 102 fits between adjacent spacers 100*a* and 100*b*. When the stack has been assembled and compressed, spacers 100*a* and 100*b* compress and hold kapton layer 102, which holds MEA 62 in place.

Fuel cell stack 60 compresses bi-polar plates 44 and MEAs. For the stack 60 shown in FIG. 1A, bolts 82 apply compression forces to the stack 60. In another embodiment, polymer adhesion and attachment to and between bi-polar plates 44 holds stack 60 together and maintains compression forces in stack 60. This embodiment will be described in further detail below with respect to FIG. 8.

Spacers 100 include a rigid material with an elastic modulus large enough to prevent further compression on MEA 62 once the spacers are in contact. In one embodiment, spacer 100 includes a material with an elastic modulus greater than about 1 GPa. Many metals, polymers and ceramics are suitable for use in this regard. Spacer 100 may include: a metal (stainless steel, copper, aluminum, titanium, etc.), graphite, grafoil, polymer (polyimide, FEP, LCP, etc.), ceramic, or a composite of these materials. Other materials may also be used. In one embodiment, spacer 100 includes a high temperature plastic that can withstand a continuous temperature corresponding to the maximum operating temperature of fuel cell 20. The operating temperature may range from about 80 degrees Celsius to about 200 degrees Celsius, depending on the type of fuel cell. For a 200 degrees Celsius maximum operating temperature, suitable thermoplastics include polyetheretherketone (PEEK), polyethersulfone, polyphenylene ether (PPE), and polytetrafluoroethylene (PTFE).

Figure 3C:
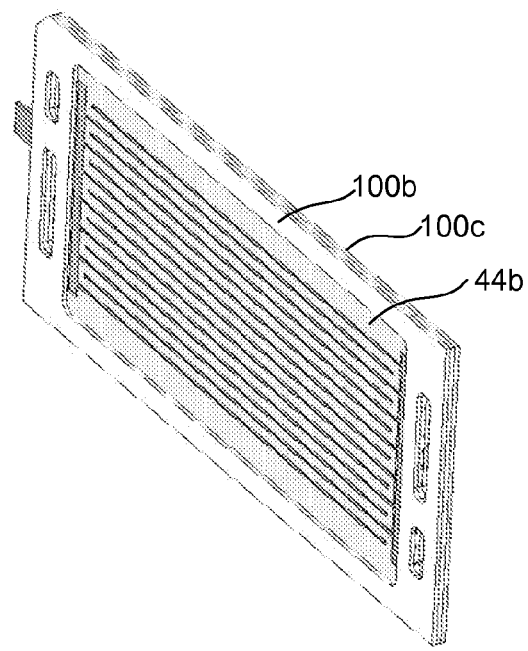
FIG. 3C shows a perspective view of a bi-polar plate with attached spacers in accordance with a specific embodiment of the present invention.
Figure 3D:
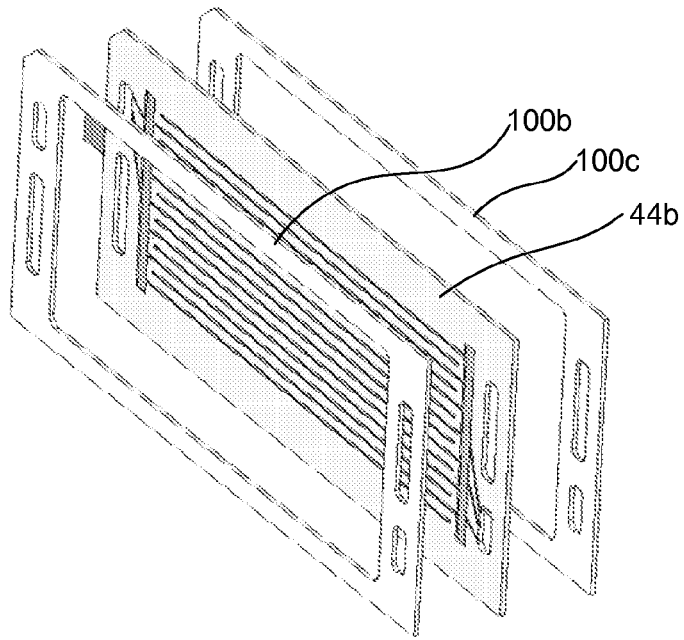
FIG. 3D shows an exploded view of the spacers and bi-polar plate of FIG. 3C.
Figure 3E:
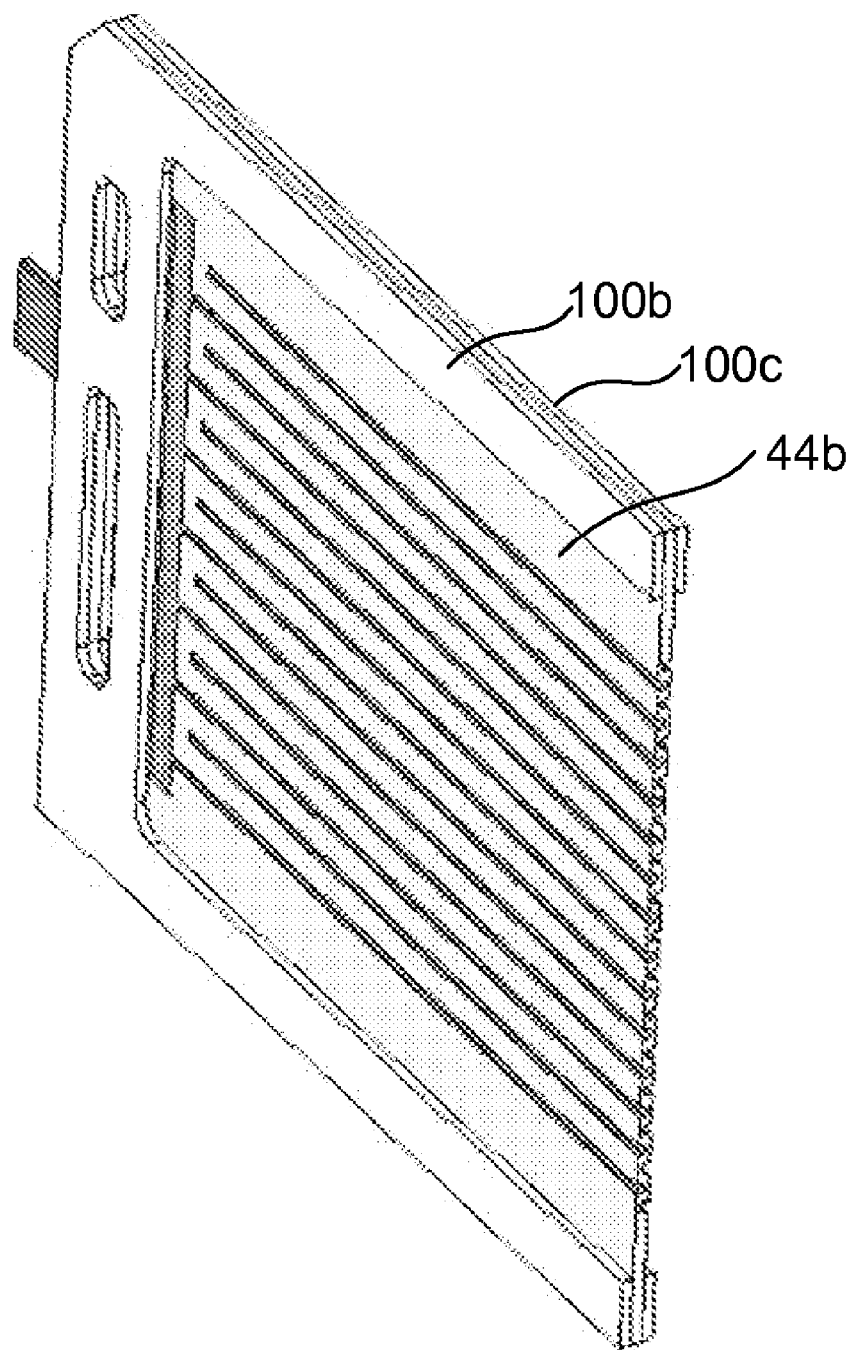
FIG. 3E shows a cross sectional perspective view of the spacers attached to the bi-polar plate of FIG. 3C.

As shown in FIGS. 3A and 3C, two spacers 100*b* and 100*c* are attached to either side of a flat bi-polar plate 44*b*. FIG. 3D shows an exploded view of the spacers 100*b* and 100*c* and bi-polar plate 44*b*. FIG. 3E shows a cross sectional perspective view of the spacers 100*b* and 100*c* attached to bi-polar plate 44*b*.

Returning back to FIG. 3A, during and after assembly of stack 60, spacers 100*a* and 100*b* control the compression thickness of MEA 62. More specifically, when stack 60 is compressed, spacers 100*a* and 100*b* provide a hard stop for the vertical distance between adjacent plates 44 and a hard stop for the compression of MEA 62 in a fuel cell stack. In this case, the compression thickness of MEA 62 after assembly of stack 60 is roughly the depth 112 provided by spacers 100*a* and 100*b* between opposing surfaces 91 on plates 44*a* and 44*b* (e.g., the kapton layer 102 may add to depth 112 and the compression thickness of MEA 62).

Spacers 100 separate manufacture of two features of a bi-polar plate 44—the flow field 72 and socket 110—so that these can be created separately. This opens the number of manufacturing methods for each feature and for of these parts. Separate manufacture of bi-polar plate and socket (and their respective 2-D profiles, as opposed to bi-polar plate needing a 3-D manufacturing process): increases the number of permissible fabrication approaches, and lowers bi-polar plate and stack cost. In many cases, spacers 100 permit improved control of the compression thickness of MEA 62 using a low cost, highly dimensionally controllable, and well-sealed manufacturing process for spacer 100 and/or bi-polar plate 44.

By contrast, in FIG. 1B, the socket that determined MEA 62 thickness was a part of, and recessed into, the adjacent bi-polar plates 44. Fabricating multiple recesses in a plate (one for the socket, and a second for the channels in the socket) requires 3-D manufacturing capability, and quality control of this recessed dual-depth is difficult. In addition, fabricating this recessed depth can increase the cost of a bi-polar plate and limits the methods by which the bi-polar plate flow fields can be manufactured.

Thus, by adding the spacers 100 during fabrication and then bonding each to a flat bi-polar plate 44, manufacture of stack 60 and fuel cell 20 becomes less expensive. At the least, the use of spacers 100 avoids the need for manufacturing raised features on each bi-polar plate 44 to form a socket 110 for an MEA, which simplifies the manufacture of each plate. Again, devoid of spacers 100, bi-polar plate 44 often needs two depths of machining and material removal from substrate 89 (one for the socket depth 112 and another for the channel 76 depth). With spacers 100, bi-polar plate 44 only needs a single depth of machining for the channel 76 depth. Because each spacer 100 and bi-polar plate 44 are both substantially a two-dimensional part, each with a particular thickness, the number of permissible manufacturing methods for creating spacer 100 and plate 44 increases, which increases manufacturing flexibility, increases options for reliable manufacturing, and reduces cost. Methods for 2-D manufacture of spacer 100 and plate 44 may include, for example, water-jet cutting, laser cutting, photochemically etching, machining, electro-discharge machining, stamping, molding, etc. A single-depth design of bi-polar plate 44 also permits the flow field 72 to be created through several simpler 2-D manufacturing methods, such as: photochemical etching, electrochemically grinding, machining and 2-D milling, stamping, coining, molding, etc.

Numerous attachment techniques may be used during manufacture to attach spacer 100 to bi-polar plate 44. As one of skill in the art will appreciate, the materials used for spacer 100 and bi-polar plate 44 will affect the permissible attachment options. Depending on the plate 44 material and spacer 100 material, the bonding methods may include: laser-welding, brazing, ultrasonic welding, radio frequency welding, heat sealing, diffusion bonding or brazing, for example. Increasing the number of options for attachment improves manufacture by potentially reducing costs, selecting a manufacturing technique that increases reliability, etc.

In one embodiment, one or both spacers 100a and 100b are permanently attached to a bi-polar plate 44 using bonding processes such as diffusion bonding, laser welding, brazing or adhesion. One suitable adhesive is Viton THA-3000 as provided by Thermodyne of Sylvania, Ohio. This adhesive attachment functions as a mechanical feature that allows for high speed robotic handling of the bonded bi-polar plates, and also functions as a gas sealant. Other suitable adhesives include: Viton caulk or Fluorodyn Caulk as provided by Thermodyne; Epoxy, Master Bond EP46HT-1 or Epoxy, Master Bond EP17HT as provided by Master Bond, Hackensack of N.J.

In another embodiment, fuel cell 20 includes an adhesive hydraulic sealant that attaches spacer 100 to bi-polar plate 44. The hydraulic sealant provides: a) a hermetic seal between spacer 100 and bi-polar plate 44 and; b) a hermetic seal between spacer 100 and MEA 62. The hydraulic sealant also offers chemical resistance—at fuel cell operating temperatures—to chemicals used the fuel cell, such as phosphoric acid. A suitable hydraulic sealant is Krytox sealant manufactured by DuPont of Wilmington Del. for example, which has enough "tack" to keep the bi-polar plate 44 and spacer 100 joined to each other during manufacture, which also permits high-speed robotic handling.

The attachment between bi-polar plate 44 and spacer 100 may also provide sealing. The particular sealing technique used may depend on the to materials bi-polar plate 44 and spacer 100, as one of skill in the art will appreciate. For instance, a copper spacer 100 may be laser-welded to a copper bi-polar plate 44. Weld paths may be used to seal one manifold from the other. Another attachment uses a thin film of PTFE (Polytetrafluoroethylene) placed between a metal plate and metal frame. This polymer layer bonds the two metal layers when placed under heat and pressure. In another embodiment, spacer 100 is made of a polymer and laminated to a metal flat bi-polar plate 44 using a heat-sealing method.

Figure 4A:
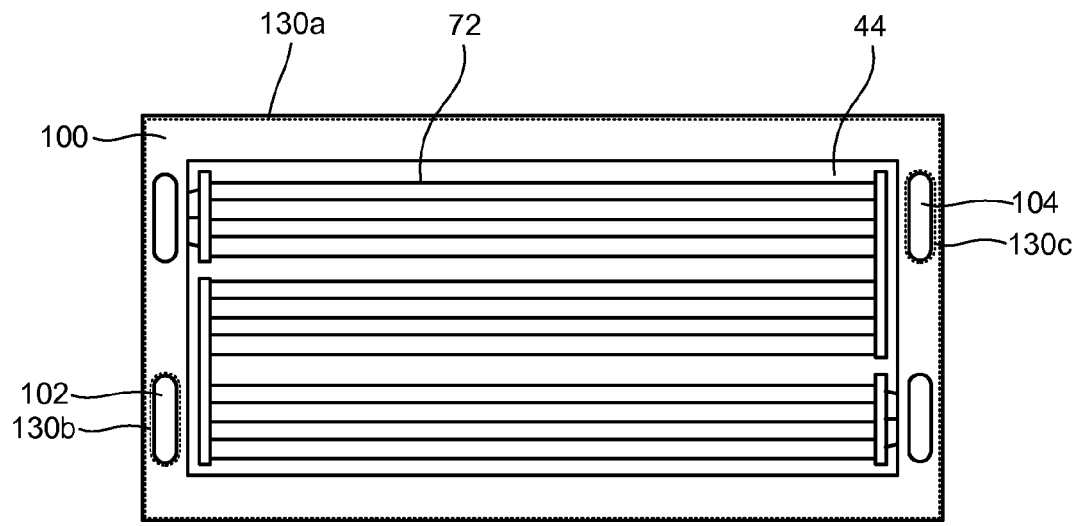
FIG. 4A shows a series of sealing lines between a spacer and bi-polar plate in accordance with a specific embodiment of the present invention.

One or more sealing lines may define the contact and sealing portions between bi-polar plate 44 and spacer 100. FIG. 4A shows a series of sealing lines 130, as dashed lines, in accordance with a specific embodiment of the present invention. Bi-polar plate 44 shows the cathode face with a cathode flow field 72.

Sealing lines 130 include laser weld paths that seal the anode manifolds 102 and 104 from the cathode flow field 72. A first sealing line 130a includes a butt (or lap) weld that is perpendicular to the seam between spacer 100 and bi-polar plate 44, and seals the external perimeter of the stack along the planar sides. A second sealing line 130b includes a fillet weld that perimetrically borders inlet hydrogen manifold 102 and seals the hydrogen manifold 102 from the cathode flow field 72; a third sealing line 130c includes a fillet weld that borders outlet hydrogen manifold 104 and seals outlet hydrogen manifold 104 from the cathode flow field 72.

Figure 4B:
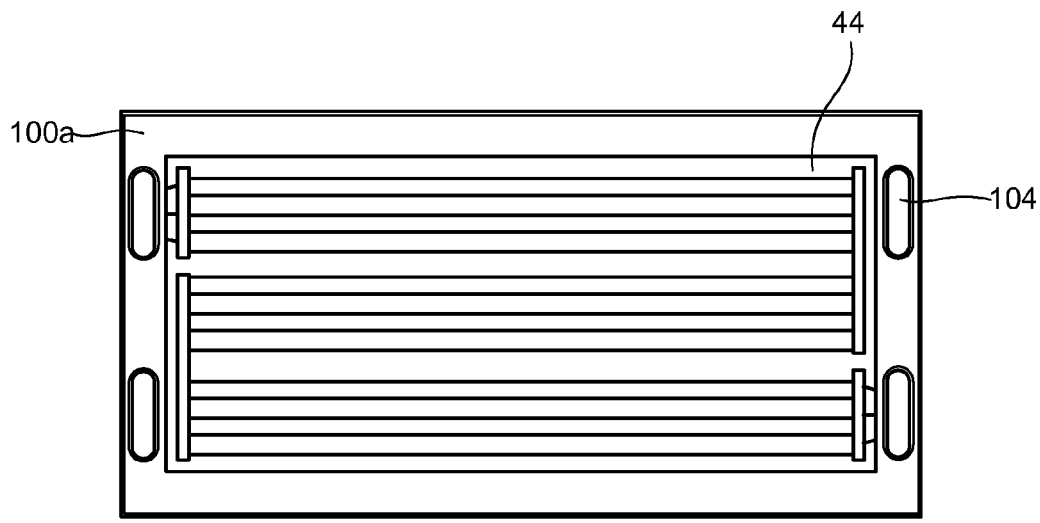
FIG. 4B shows a series of sealing lines in accordance with another specific embodiment of the present invention.

Numerous alterations to the design using spacers 100 are permissible. FIG. 4B shows the sealing lines 140 for a spacer 100a and bi-polar plate 44 in accordance with another specific embodiment of the present invention.

Figure 4C:
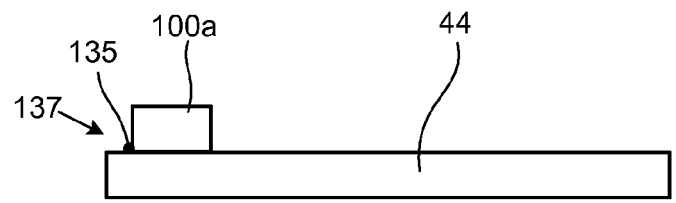
FIG. 4C shows a fillet weld between bi-polar plate and spacer, which is applied at a corner between bi-polar plate and spacer.

In this case, spacer 100a includes a smaller planar area than bi-polar plate 44 along sealing lines 140. This permits the use of a fillet weld along sealing lines 140. FIG. 4C shows a fillet weld 135 between bi-polar plate 44 and spacer 100a, which is applied at a corner 137 between bi-polar plate 44 and spacer 100a. The smaller planar area of spacer 100a permits a corner 137 to exist along any sealing lines between bi-polar plate 44 and spacer 100a. For example, this permits a fillet weld to be used for all three sealing lines 130a, 130b and 130c of FIG. 4A.

As mentioned above, spacer 100 allows a bi-polar plate to be machined with one depth for each face (e.g., just one depth for the channels on that face). In another embodiment, fuel cell stack manufacture and assembly is further simplified by forming a bi-polar plate from two (initially) separate sheets.

Figure 5:
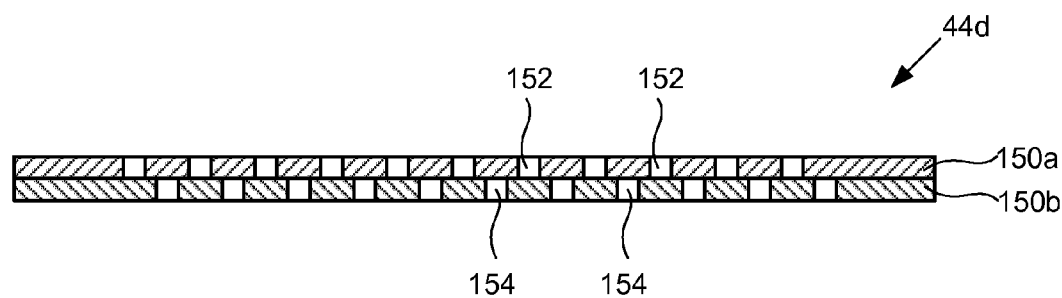
FIG. 5 shows a bi-polar plate including multiple flat sheets in accordance with one embodiment of the present invention.

FIG. 5 shows a bi-polar plate 44d in accordance with another embodiment of the present invention. Bi-polar plate 44d includes two relatively flat sheets 150a and 150b. Each flat sheet 150 includes a channel field whose channels extend through the sheet from one face of the sheet to the other face. For example, flat sheet 150a includes anode channels 152 that pass through sheet 150a, while flat sheet 150b includes cathode channels 154 that pass through sheet 150b.

Sheets 150a and 150b are assembled such that channels 152 and channels 154 do not overlap. The solid portions of one sheet 150 then act as a bottom for channels of the other sheet, as shown. Sheets 150a and 150b are attached using any suitable technique, and sealed, according to their respective materials. Suitable materials for sheets 150a and 150b include any material listed above with respect to substrate 89 of bi-polar plate 44.

Because each sheet 150 is a two-dimensional part, with a particular thickness, the number of permissible manufacturing methods for creating each sheet 150 opens, which increases manufacturing flexibility, increases options for reliable manufacturing, and reduces cost. Methods for manufacture of sheet 150 may include, for example, waterjet cutting, laser cutting, photochemical etching, machining, electrochemical grinding, 2-D milling, electro-discharge machining, stamping, coining, molding, etc.

The simplified bi-polar plate designs permit 2-D manufacturing of bi-polar plates 44, sheets 150, and/or spacers 100. This permits the use of high throughput and low-cost manufacture techniques.

Figure 6:
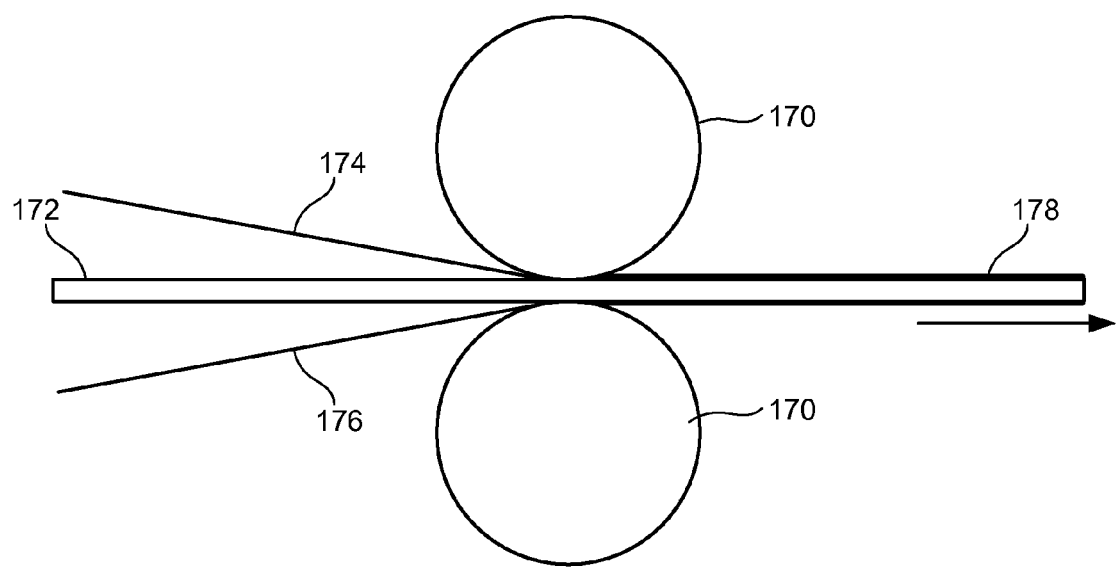
FIG. 6 shows clad manufacturing of a bi-polar plate substrate in accordance with one embodiment of the present invention.
Figure 7A:
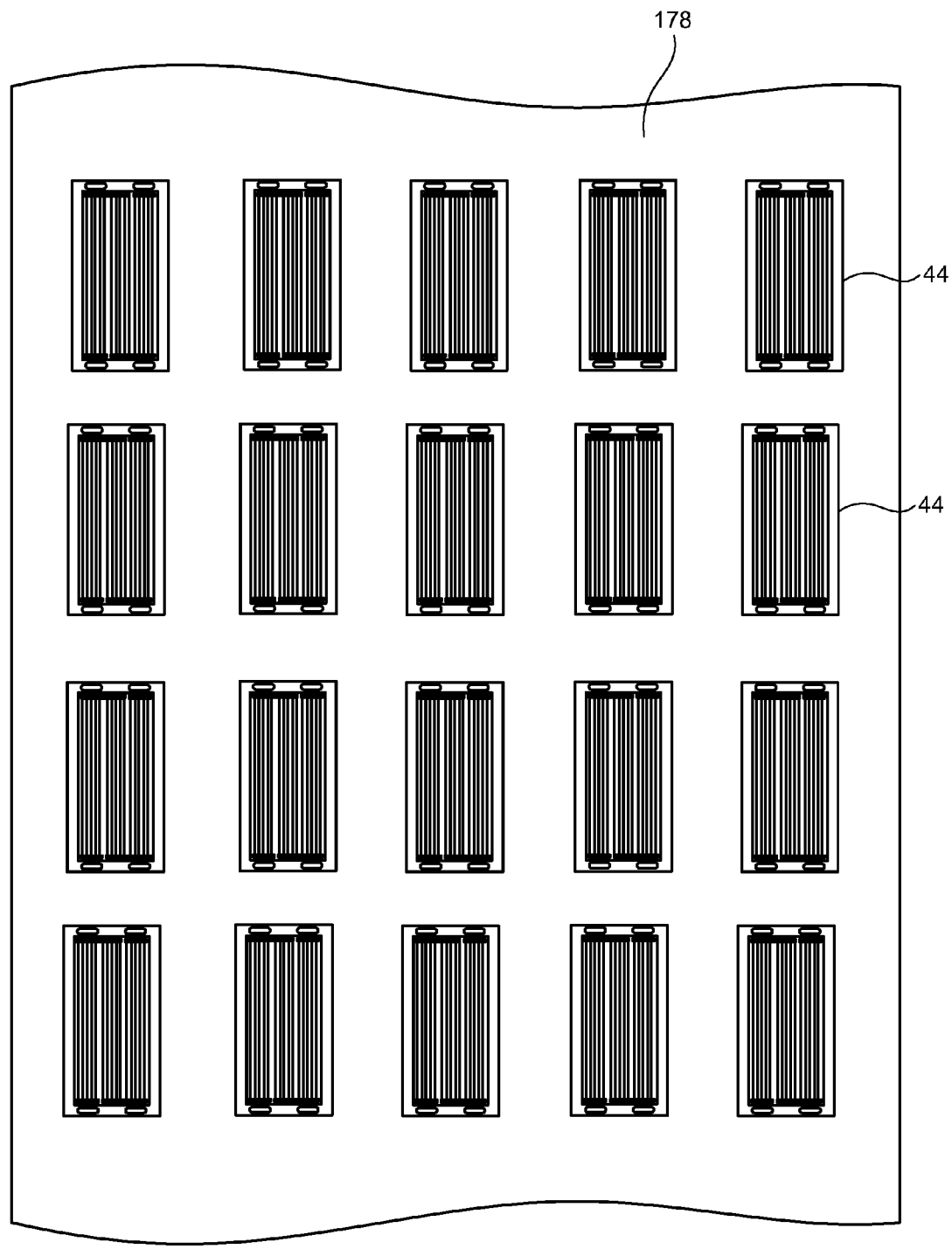
FIG. 7A shows the clad sheet output in FIG. 6 after stamping in accordance with a specific embodiment of the present invention.

For example, FIG. 6 shows clad manufacturing of a bi-polar plate 44 in accordance with one embodiment of the present invention. Bi-polar plate manufacture in this case includes two steps: a clad step (FIG. 6), and a channel-forming step (techniques may vary and FIG. 7A shows the output of this second step) that together output a two-dimensional bi-polar plate.

As shown in FIG. 6, three layers are provided to cladding rolls 170: an inner layer 172, a top layer 174, and bottom layer 176. Inner layer 172 forms the main substrate 89 for bi-polar plate 44; copper is suitable in many embodiments. Top player 174 and bottom layer 176 form plated surfaces on inner layer 172 and improve chemical resistance and/or conductivity of bi-polar plate 44. Gold is suitable for use with copper, and sometimes includes a thin layer of nickel between the gold and copper to prevent the gold from diffusing into the copper. Cladding rolls 170 cold-roll compress the layers 170, 172 and 174 to output a single clad sheet 178 with the inlet layers formed together into an integral plate. Clad sheet 178 resembles substrate 89 in bi-polar plate 44 before any channels or other feature have been added.

Channels 72 and other features in bi-polar plate 44 are then formed into clad sheet 178. In one embodiment, a stamping process is used to produce channels 72 in bi-polar plate 44. Stamping permits "roll forming", shearing and punching for high volume manufacturing. Stamping may be used to produce sheets 150 of bi-polar plate 44 as shown in FIG. 7A. A stamping process may also be used to create spacers 100. Other manufacturing techniques suitable to form channels in clad sheet 178 include coining and find blanking, for example.

Clad sheet 178 may include a large number of bi-polar plates 44 after stamping. FIG. 7A shows clad sheet 178 after stamping in accordance with a specific embodiment of the present invention. In this case, this segment of clad sheet 178 includes 20 bi-polar plates 44. Obviously, clad sheet 178 may be continuous sheet with many more bi-polar plates 44. Portable fuel cells typically include bi-polar plates 44 with a planar area less than about 200 cm squared. Clad sheet 178 may be as wide as a meter, which allows even more bi-polar plates 44 across its width.

The cladding and stamping process permit roll-to-roll manufacturing. This provides high throughput and inexpensive manufacture of thousands of bi-polar plates 44. The cladding and stamping processes may also produces precise manufacturing tolerances (e.g., thickness of bi-polar plate 44) relative to milling operations.

Geometry of a bi-polar plate may vary. In some cases, channel geometry may be affected by the manufacturing technique used to make the bi-polar plate. FIGS. 7B-7E various bi-polar plate and channel geometries suitable for use herein, and made using various manufacturing techniques.

Figure 7B:
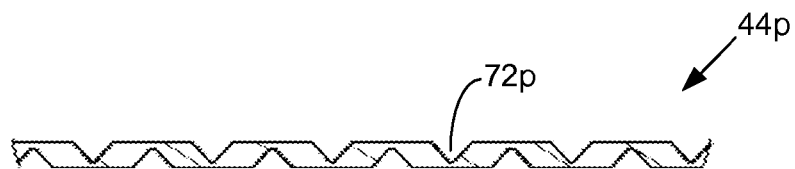
FIGS. 7B-7E various suitable bi-polar plate geometries made using various manufacturing techniques described herein.

FIG. 7B shows a bi-polar plate 44$p$ made from rolling and coining processes in accordance with a specific embodiment of the present invention. Bi-polar plate 44$p$ includes channels 72$p$ with pointed and sharp features produced in a coining process.

Figure 7C:
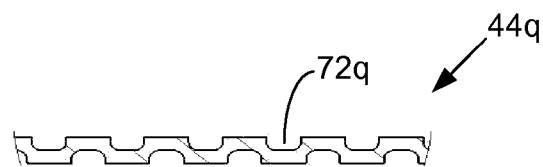

FIG. 7C shows a bi-polar plate 44$q$ made from photochemical etching in accordance with a specific embodiment of the present invention. Bi-polar plate 44$q$ includes channels 72$q$ whose dimensions are rounded to desired dimensions using the better spatial control provided by photochemical etching.

Figure 7D:
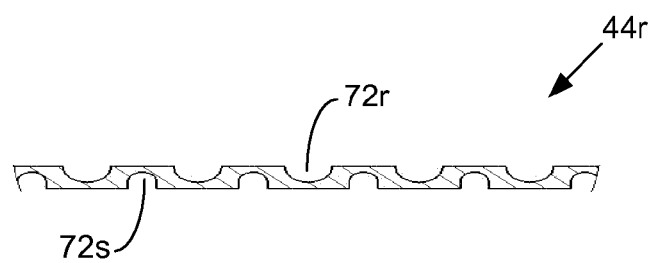

FIG. 7D shows a bi-polar plate 44$r$ made from photochemical etching in accordance with another specific embodiment of the present invention. In this case, the plate includes cathode channels 72$r$ that are larger than the anode channels 72$s$. The cathode channels 72$r$ provide low resistance airflow paths that are configured for, and well suited for use with, an open manifold design (see FIG. 9) that allows air to be supplied directly through channels 72$r$ using a fan or blower.

Figure 7E:
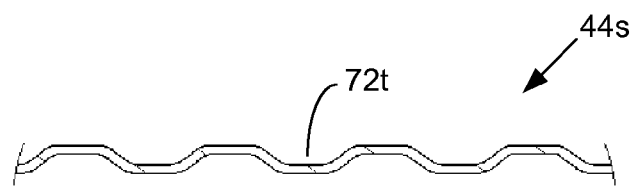

FIG. 7E shows a bi-polar plate 44$s$ made from rolling and stamping processes in accordance with a specific embodiment of the present invention. Bi-polar plate 44$s$ includes contiguous channel dimensions 72$t$ with less pointed and sharp features, as would be reultant from a stamping process.

Figure 8:
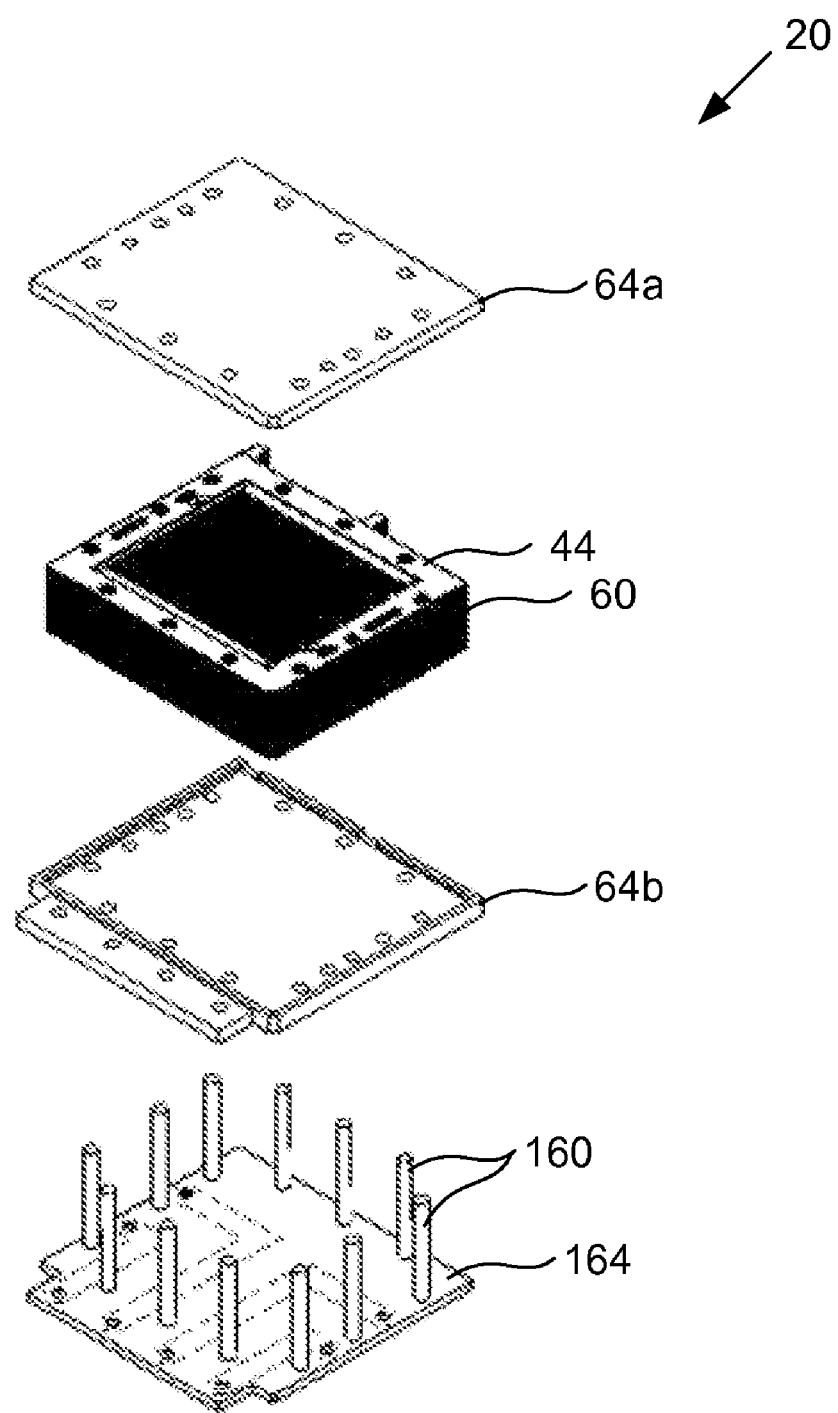
FIG. 8 shows an exploded view of a fuel cell stack in accordance with another embodiment of the present invention.

As mentioned above, the MEA is compressed and plates are held together after stack assembly is finished. FIG. 8 shows an exploded view of a fuel cell 20 in accordance with one embodiment of the present invention. Fuel cell 20 includes polymer elements 160 that extend through bi-polar plates 44 of stack 60.

Polymer elements 160 are configured to attach two adjacent bi-polar plates 44 in stack 60 when the stack is assembled. FIG. 8 shows the exploded view before the stack is vertically assembled. After vertical assembly, energy is provided to polymer elements 160 to cause slight melting and deformation to the polymer in elements 160, thereby attaching: top plate 64$a$ to the topmost bi-polar plate 44, all adjacent bi-polar plates 44 in stack 60, the bottommost bi-polar plate 44 in stack 60 to bottom plate 64$b$, and bottom plate 64$b$ to manifold plate 164.

In this case, the same polymer elements 160 pass from the top of stack 60 to the bottom and extend through each bi-polar plate 44 in stack 60, resembling rivets or bolts that pass through the entire stack. Although not shown, fuel cell 20 may include a receiving polymer layer or ring disposed on the top side of end plate 64$a$; this receiving polymer layer or ring includes a number of holes configured to mate with the distal ends of polymer elements 160. Energy input into the polymer elements and receiving polymer layer or ring then attaches the bottom plate 164 to the receiving polymer layer or ring disposed on the top side of end plate 64$a$, similar to bolts that pass from top to bottom as shown in FIG. 1A.

In another embodiment, stack 60 includes smaller polymer elements 160 that only blind two adjacent bi-polar plates 44. Cumulatively, when all the bi-polar plates 44 are assembled in stack 60, the smaller polymer elements 160 hold the entire stack 60 together and maintain any compression forces applied thereto during the energy input.

Polymer elements 160 may include any polymer that deforms under external energy, such as ultrasonic input, to form a shape suitable to attach multiple but polar plates. The polymer elements, after deformation, also include suitable rigidity and strength to prevent movement between adjacent bi-polar plates 44. In one embodiment, polymer elements 160 include a moldable polymer, such as liquid crystal polymer (LCP) or polyphenol polymer (PPS). Other polymers are suitable for use. For example, numerous thermoplastics are suitable for use with ultrasonic welding.

The input energy may include any single or combination of energy sources suitable to reshape the polymer elements 160. Heat and/or ultrasonic welding are suitable for use. For example, ultrasonic welding may be used to join two adjacent bi-polar plates using polymer elements 160. In one embodiment, the polymer elements 160 employ ultrasonic concentration features (such as triangles and grooves) that reduce the energy and/or time needed to start and complete melting. The ultrasonic concentration features may also include features and joints that promote energy direction and/or joint shear. An energy director joint design may be used and includes one or more raised triangular or pointed beads of material molded on one of the joint surfaces. One function of the energy director is to concentrate energy to rapidly initiate softening and melting of the joining surfaces. A tongue and groove may also be applied on the joining surfaces to prevent flash, both internally and externally, and provide alignment. A step joint, textured surface, criss-cross, chisel or other energy directing geometry may also be used to increase efficiency or efficacy of the ultrasonic welding.

Typically, compression of stack 60 occurs after the layers have been vertically assembled. Energy input into polymer elements 160 may then occur while the entire stack 60 is compressed. When the energy has been removed and polymer elements 160 reshaped by the input energy, the re-solidified polymer elements 160 then hold stack 60 in its compressed state. For manufacturing perspective, this manufacturing method provides repeatable and reliable compression on stack 60 for hundreds or thousands of fuel cells being manufactured.

The number of polymer elements 160 may vary. In one embodiment, fuel cell 20 includes between about 2 and about 30 polymer elements per bi-polar plate. As shown in FIG. 8, each of these polymer elements 160 may pass through multiple bi-polar plates 44 in stack 60. In a specific embodiment, fuel cell 20 includes between about 4 and about 16 polymer elements per bi-polar plate.

Figure 9:
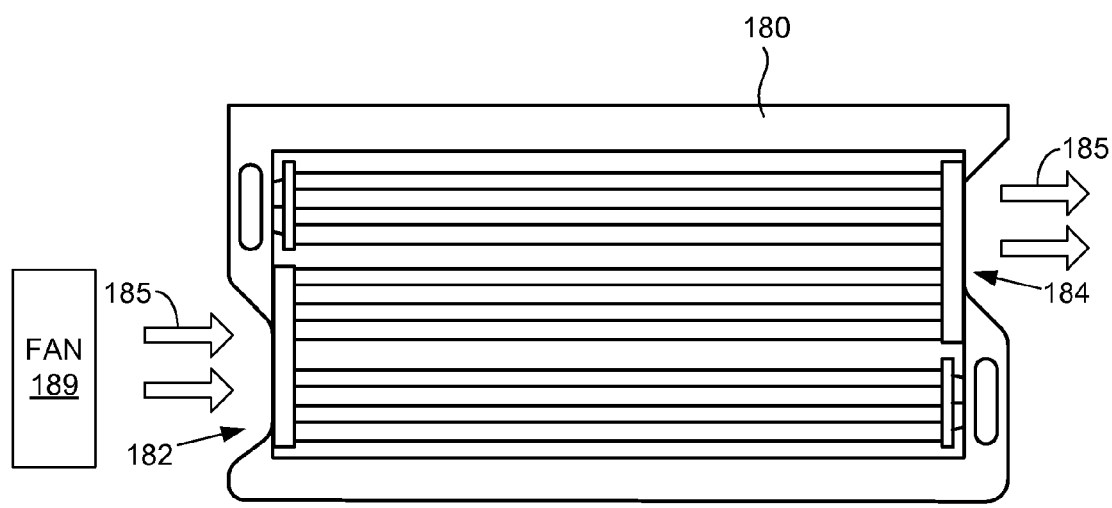
FIG. 9 shows a bi-polar plate in accordance with another embodiment of the present invention.

FIG. 9 shows a bi-polar plate 180 in accordance with another embodiment of the present invention. Bi-polar plate 180 includes an open inlet cathode manifold 182 and an open outlet cathode manifold 184.

A fuel cell stack 60 using bi-polar plate 180 then includes multiple bi-polar plates 180 stacked vertically such that open cathode manifold 182 extends vertically through the entire stack 60 to service each bi-polar plate 180 of the stack.

The open manifolds 182 and 184 simplify oxygen movement through a fuel cell stack in a portable fuel cell system. Open inlet cathode manifold 182 opens to the environment around the stack 50 and fuel cell 20 and permits a fan 189 to blow air 185 into open cathode manifold 182. The air then passes through each bi-polar plate 180 in stack 60, and to open outlet cathode manifold 184. The heated and humid air exhausted from fuel cell stack 60 may then be provided into the ambient environment without any additional plumbing. In another embodiment, bi-polar plate 180 does not include an open outlet cathode manifold 184, but includes a closed cathode manifold that outlets the oxygen to plumbing for use in a fuel processor.

By contrast, inlet cathode manifold 106 of FIG. 1C increases flow resistance and typically relies on a compressor to push air and oxygen through the inlet plumbing to manifold 06, through inlet cathode manifold 106, through the cathode channels 72 in all bi-polar plates 44 of stack 60, and at of stack 60 and bi-polar plate 20. The compressor is typically large and heavy for a portable fuel cell system.

Figure 10:
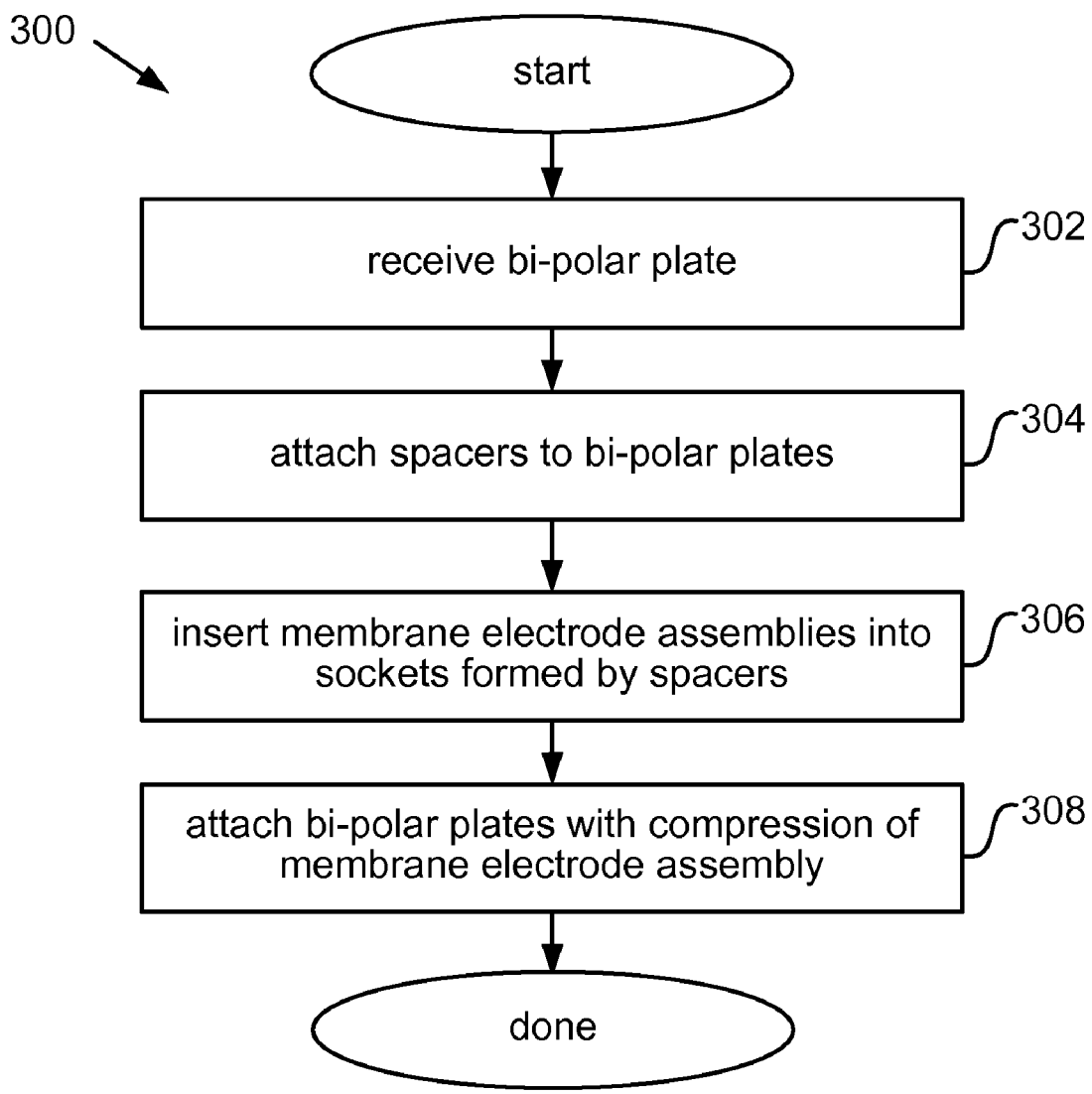
FIG. 10 shows a method for manufacturing a fuel cell in accordance with one embodiment of the present invention.

FIG. 10 shows a method 300 for manufacturing a fuel cell in accordance with one embodiment of the present invention.

Method 300 begins by receiving a bi-polar plate (302). In one embodiment, construction of the bi-polar plate is outsourced to a vendor in the bi-polar plates are received from the vendor. In another embodiment, bi-polar plate manufacture precedes method 300. Numerous suitable techniques for mass production of bi-polar plates were described above. For example, the bi-polar plate may be made using high throughput techniques such as cladding and stamping. A bi-polar plate may also be formed in a single molding, stamping, machining or MEMs process of a single metal sheet, for example.

One or more spacers are then attached to each bi-polar plate (304). Suitable attachment techniques were described above with respect to FIGS. 3-4 and may include welding, brazing, and polymer-to-polymer welding, for example. In some cases, one or more sealing lines may be formed between the spacer and bi-polar plate to regulate movement of reactants and products in a fuel cell stack. A membrane electrode assembly is then inserted into a socket formed by the spacers and bi-polar plate (306).

Steps 302-306 may be repeated in parallel for multiple plates, spacers and membrane electrode assemblies. In a specific embodiment, the stack shown in FIG. 1C is assembled vertically one bi-polar plate at a time. Commonly, the membrane electrode assembly is disposed within the socket after the first spacer is attached to a first bi-polar plate, and before the spacer a second bi-polar plate laid overtop the MEA and first bi-polar plate.

The bi-polar plates in the stack are then attached to each other, along with compression of the stack and membrane electrode assemblies included therein (308). In one embodiment, all the plates in the stack are attached and compressed in a single step, such as using bolts that screw to a desired compression pressure on the MEA. Another single step attachment and compression uses polymer binding as described above with respect to FIG. 8. In this case, a desired pressure on stack is maintained while the polymer is welded to its new shape. In another embodiment, bi-polar attachment occurs one plate at a time between each pair of adjacent bi-polar plates. Polymer binders as described above are suitable for use in this regard.

The amount of compression on the stack may vary. In one embodiment, the stack is compressed to a desired socket depth 112 between bi-polar plates 44 (see FIG. 3A). The MEA 62 manufacturer may specify the socket depth 112. Other socket depths 112 may be used. The cumulative height for spacers 100a and 100b may be selected to provide a socket depth corresponding to a certain fraction of the MEA 62 height before compression. In one embodiment, the cumulative height for spacers 100a and 100b is between about 0.7 and about 0.9 of the MEA 62 height before compression. In a specific embodiment, the cumulative height for spacers 100a and 100b is between about 0.75 and about 0.85 of the MEA 62 height before compression. This may or may not include thickness of kapton layer 102. Other parameters may be used to determine the socket depth 112.

Figure 11:
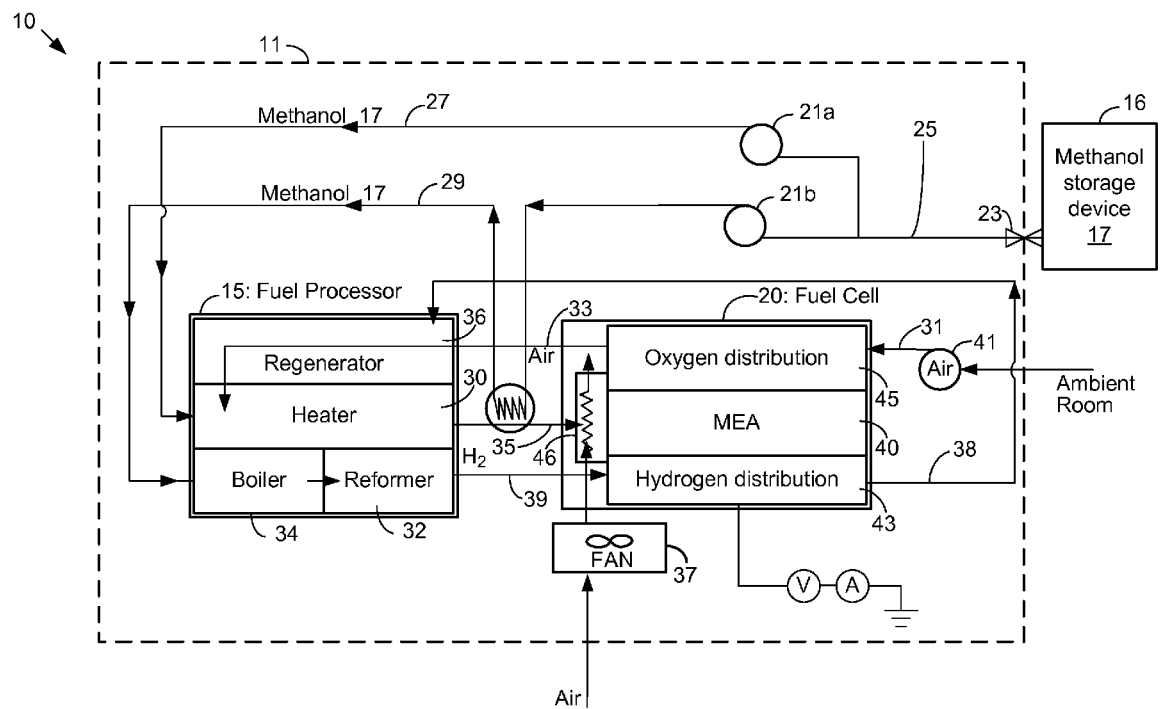
FIG. 11 illustrates schematic operation for a reformed fuel cell system in accordance with a specific embodiment of the present invention.

As mentioned above, fuel cell 20 may be used in a reformed fuel cell system (RMFC). FIG. 11 illustrates schematic operation for the fuel cell system 10 in accordance with a specific embodiment of the present invention.

Fuel storage device 16 stores methanol or a methanol mixture as a hydrogen fuel 17. An outlet of storage device 16 includes a connector 23 that mates with a mating connector on a package 11. In this case, a fuel cell package 11 includes the fuel cell 20, fuel processor 15, and all other balance-of-plant components except the cartridge 16. In a specific embodiment, the connector 23 and mating connector form a quick connect/disconnect for easy replacement of cartridges 16. The mating connector communicates methanol 17 into hydrogen fuel line 25, which is internal to package 11 in this case.

Line 25 divides into two lines: a first line 27 that transports methanol 17 to a heater/heater 30 for fuel processor 15 and a second line 29 that transports methanol 17 for a reformer 32 in fuel processor 15. Lines 25, 27 and 29 may comprise channels disposed in the fuel processor (e.g., channels in metals components) and/or tubes leading thereto.

Flow control is provided on each line 27 and 29. Separate pumps 21a and 21b are provided for lines 27 and 29, respectively, to pressurize each line separately and transfer methanol at independent rates, if desired. A model 030SP-S6112 pump as provided by Biochem, N.J. is suitable to transmit liquid methanol on either line in a specific embodiment. A diaphragm or piezoelectric pump is also suitable for use with system 10. A flow restriction may also provided on each line 27 and 29 to facilitate sensor feedback and flow rate control. In conjunction with suitable control, such as digital control applied by a processor that implements instructions from stored software, each pump 21 responds to control signals from the processor and moves a desired amount of methanol 17 from storage device 16 to heater 30 and reformer 32 on each line 27 and 29. In another specific embodiment shown, line 29 runs inlet methanol 17 across or through a heat exchanger that receives heat from the exhaust of the heater 30 in fuel processor 15. This increases thermal efficiency for system 10 by preheating the incoming fuel (to reduce heating of the fuel in heater 30) and recuperates heat that would otherwise be expended from the system.

Air source 41 delivers oxygen and air from the ambient room through line 31 to the cathode in fuel cell 20, where some oxygen is used in the cathode to generate electricity. Air source 41 may include a pump, fan, blower or compressor, for example. High operating temperatures in fuel cell 20 also heat the oxygen and air.

In the embodiment shown, the heated oxygen and air is then transmitted from the fuel cell via line 33 to a regenerator 36 (also referred to herein as a 'dewar') of fuel processor 15, where the air is additionally heated (by the heater, while in the dewar) before entering heater 30. This double pre-heating increases efficiency of the fuel cell system 10 by a) reducing heat lost to reactants in heater 30 (such as fresh oxygen that would otherwise be near room temperature when combusted in the heater), and b) cooling the fuel cell during energy production. In this embodiment, a model BTC compressor as provided by Hargraves, NC is suitable to pressurize oxygen and air for fuel cell system 10.

A fan 37 blows cooling air (e.g., from the ambient room) over fuel cell 20.

Fuel processor 15 receives methanol 17 and outputs hydrogen. Fuel processor 15 comprises heater 30, reformer 32, boiler 34 and regenerator 36. Heater 30 (also referred to herein as a burner when it uses catalytic combustion to generate heat) includes an inlet that receives methanol 17 from line 27. In a specific embodiment, the burner includes a catalyst that helps generate heat from methanol. In another embodiment, heater 30 also includes its own boiler to preheat fuel for the heater.

Boiler 34 includes a boiler chamber having an inlet that receives methanol 17 from line 29. The boiler chamber is configured to receive heat from heater 30, via heat conduction through walls in monolithic structure between the boiler 34 and heater 30, and use the heat to boil the methanol passing through the boiler chamber. The structure of boiler 34 permits heat produced in heater 30 to heat methanol 17 in boiler 34 before reformer 32 receives the methanol 17. In a specific embodiment, the boiler chamber is sized to boil methanol before receipt by reformer 32. Boiler 34 includes an outlet that provides heated methanol 17 to reformer 32.

Reformer 32 includes an inlet that receives heated methanol 17 from boiler 34. A catalyst in reformer 32 reacts with the methanol 17 to produce hydrogen and carbon dioxide; this reaction is endothermic and draws heat from heater 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium or platinum that is preferential to carbon monoxide over hydrogen.

Regenerator 36 pre-heats incoming air before the air enters heater 30. In one sense, regenerator 36 uses outward traveling waste heat in fuel processor 15 to increase thermal management and thermal efficiency of the fuel processor. Specifically, waste heat from heater 30 pre-heats incoming air provided to heater 30 to reduce heat transfer to the air within the heater. As a result, more heat transfers from the heater to reformer 32. The regenerator also functions as insulation for the fuel processor. More specifically, by reducing the overall amount of heat loss from the fuel processor, regenerator 36 also reduces heat loss from package 10 by heating air before the heat escapes fuel processor 15. This reduces heat loss from fuel processor 15, which enables cooler fuel cell system 10 packages.

Line 39 transports hydrogen (or 'reformate') from fuel processor 15 to fuel cell 20. In a specific embodiment, gaseous delivery lines 33, 35 and 39 include channels in a metal interconnect that couples to both fuel processor 15 and fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31; an oxygen intake manifold receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels, and in one embodiment, delivers the gases to the ambient room.

In the embodiment shown, the anode exhaust is transferred back to fuel processor 15. In this case, system 10 comprises plumbing 38 that transports unused hydrogen from the anode exhaust to heater 30. For system 10, heater 30 includes two inlets: an inlet configured to receive fuel 17 and an inlet configured to receive hydrogen from line 38. In one embodiment, gaseous delivery in line 38 back to fuel processor 15 relies on pressure at the exhaust of the anode gas distribution channels, e.g., in the anode exhaust manifold. In another embodiment, an anode recycling pump or fan is added to line 38 to pressurize the line and return unused hydrogen back to fuel processor 15.

In one embodiment, fuel cell 20 includes one or more heat transfer appendages 46 that permit conductive heat transfer with internal portions of a fuel cell stack. In a specific heating embodiment as shown, exhaust of heater 30 in fuel processor 15 is transported to the one or more heat transfer appendages 46 in fuel cell 20 during system start-up to expedite reaching initial elevated operating temperatures in the fuel cell 20. The heat may come from hot exhaust gases or unburned fuel in the exhaust, which then interacts with a catalyst disposed in proximity to a heat transfer appendage 46. In a specific cooling embodiment, fan 37 blows cooling air over the one or more heat transfer appendages 46, which provides dedicated and controllable cooling of the stack during electrical energy production.

In one embodiment, in operation under steady state conditions, methanol fuel 17 moves into reformer 32 where it is converted to reformate gas 39. This reformate gas is fed into a fuel cell anode 43 where a percentage of available fuel (e.g., hydrogen) is consumed; thereafter the remaining fuel depleted reformate is fed into a catalytic heater 30 located in fuel processor 15. In the catalytic heater 30 (or burner), the remaining fuel is oxidized and heat is released into reformer 32 to supply heat of formation for fuel 17. The fuel then exits to the burner exhaust. Air is fed via a compressor into the fuel cell cathode 45 where oxygen is consumed proportionally to the fuel consumed at the anode. The oxygen-depleted, steam-enriched, air then exits the cathode 45 and is fed into the fuel processor burner 30 to oxidize the remaining fuel 17 mentioned above; since the air enters the fuel cell 20 first, it gains heat thereby reducing the heat load on burner 30. The burner 30 exhaust is finally fed into a recuperator where heat from the exhaust gas is dumped into the liquid fuel 17 inlet to the reformer. This heat exchange allows for pre-vaporized fuel 17 to enter the reforming chamber from line 29, thereby reducing the heat duty on burner 30 and increasing the system 10 efficiency. In another specific embodiment, hot exhaust of the heat exchanger is fed into a second burner located in thermal communication with fuel cell 20; a separate blower or fan feeds air into the fuel cell burner with the goal of oxidizing any remaining fuel. Additional air may be supplied to the fuel cell thermal appendages via fan 37. Finally, the fuel cell cooling air and the fuel cell burner exhaust gasses converge into a single stream; the system exhaust. Further temperature dilution may be obtained by addition of a further air stream supplied by a system-cooling fan or blower. Finally, the system exhaust may be passed over exhaust section of the cartridge housing; exhaust filters or sensors may be included on the exhaust section of the cartridge housing.

On startup, the operation may differ from steady state operation. In one embodiment, a fuel igniter is activated until it is at about 300-500 degrees Celsius. Methanol 17 is fed into burner 30 and when it contacts the igniter, it flash boils and the methanol vapor mixes with air to form a combustible mixture, which is ignited by the burner catalyst. Fuel 17 and air are fed into the burner in order to heat it up to operating temperatures, e.g., about 240-300 degrees Celsius. The hot burner exhaust impinges on the fuel cell heat transfer appendages 46; thereby dumping heat from the burner exhaust gas stream into fuel cell 20. When the reformer temperature is at a desired point, and the fuel cell 20 temperature rises above the condensing point of reformate gas, fuel is fed into the reformer, whereupon it converts into a hydrogen rich gas stream (reformate.) The reformate passes through the fuel cell anode 43 where a small amount of hydrogen is consumed at the anode (e.g., a small load applied to keep the average fuel cell voltage less than 0.75V/cell to prevent carbon corrosion.) Reformate then is fed back into the burner where some fuel is oxidized (rich mixture), releasing heat into the fuel processor. Finally, the hot exhaust passes through the recuperator and into a fuel cell burner, whereupon the remaining fuel is oxidized by addition of oxygen from the startup blower. Once the fuel cell and fuel processors are at their desired temperatures, the system reverts to steady state operation.

While this invention has been described in terms of several preferred embodiments, there are alterations, permutations, and equivalents that fall within the scope of this invention which have been omitted for brevity's sake. For example, although the present invention has described stack assembly without mention of location techniques between plates, one of skill in the art is aware of numerous fixturing techniques suitable for use herein. It is therefore intended that the scope of the invention should be determined with reference to the appended claims.

What is claimed is:

1. A stack for use in an electrical energy generator, the stack comprising:
    a first bi-polar plate including a) a first sheet with a first bi-polar plate channel field formed through an entire thickness of the first sheet and b) a second sheet attached directly to the first sheet and including a second bi-polar plate channel field formed through an entire thickness of the second sheet;
    a second bi-polar plate including a) a third sheet with a third bi-polar plate channel field formed through an entire thickness of the third sheet and b) a fourth sheet attached directly to the third sheet and including a fourth bi-polar plate channel field formed through an entire thickness of the fourth sheet; and
    at least one spacer attached to perimeter portion of the first bi-polar plate and attached to perimeter portion of the second bi-polar plate, wherein the at least one spacer is configured to form a socket between the first bi-polar plate and the second bi-polar plate; and
    a membrane electrode assembly disposed between the first bi-polar plate and the second bi-polar plate; wherein the first bi-polar plate channel field is offset from the second bi-polar plate channel field and the third bi-polar plate channel field is offset from the fourth bi-polar plate channel field.

2. The stack of claim 1 wherein the at least one spacer is configured to produce a socket depth between the first bi-polar plate and the second bi-polar plate that is less than a thickness for the membrane electrode assembly before assembly of the stack.

3. The stack of claim 2 wherein the socket depth is between about 0.7 and about 0.9 times the thickness for the membrane electrode assembly before assembly of the stack.

4. The stack of claim 3 wherein the socket depth is between about 0.75 and about 0.85 times the thickness for the membrane electrode assembly before assembly of the stack.

5. The stack of claim 1 wherein the spacer has a smaller planar area than the first bi-polar plate.

6. The stack of claim 5 wherein the spacer has a larger cross sectional area for a planar feature than a planar feature on the first bi-polar plate.

7. The stack of claim 6 wherein the spacer and the first bi-polar plate both include a metal and are joined using a fillet weld.

8. The stack of claim 1 wherein the first bi-polar plate is attached to the spacer using an adhesive hydraulic sealant.

9. The stack of claim 2 wherein stack is compressed after assembly of the stack and the at least one spacer is sized to limit compression of the membrane electrode assembly.

10. The stack of claim 1, wherein the at least one spacer comprises a rigid material with an elastic modulus large enough to prevent further compression on the membrane electrode assembly once the stack is assembled.

11. The stack of claim 10, wherein the elastic modulus is greater than about 1 GPa.

12. The stack of claim of claim 1, wherein the at least one spacer comprises a material selected from the group consisting of a metal, polymer, and ceramic.

13. A stack for use in an electrical energy generator, the stack comprising:
    a first bi-polar plate including a) a first sheet with a first bi-polar plate channel field formed through the first sheet and b) a second sheet attached to the first sheet and including a second channel field formed through the second sheet, wherein channels of the first bi-polar plate channel field and the second channel field do not overlap such that solid portions of the first sheet act as a bottom for channels of the second sheet;
    a second bi-polar plate including a) a third sheet with a third bi-polar plate channel field formed through the third sheet and b) a fourth sheet attached to the third sheet and including a fourth channel field formed through the fourth sheet; and
    at least one spacer attached to perimeter portion of the first bi-polar plate and attached to perimeter portion of the second bi-polar plate, wherein the at least one spacer is configured to form a socket between the first bi-polar plate and the second bi-polar plate; and
    a membrane electrode assembly disposed between the first bi-polar plate and the second bi-polar plate.

14. The stack of claim 1, wherein the first bi-polar plate channel field comprises an anode channel field and the second bi-polar plate channel field comprises a cathode channel field.

15. The stack of claim 1, further comprising:
    a third bi-polar plate including a) a fifth sheet with a fifth bi-polar plate channel field formed through the fifth sheet and b) a sixth sheet attached to the fifth sheet and including a sixth channel field formed through the sixth sheet; and a fourth bi-polar plate including a) a seventh sheet with a seventh bi-polar plate channel field formed through the seventh sheet and b) an eighth sheet attached to the seventh sheet and including an eighth channel field formed through the eighth sheet.

16. A stack for use in an electrical energy generator, the stack comprising:

a first bi-polar plate including a) a first sheet with a first bi-polar plate channel field formed through the first sheet and b) a second sheet attached to the first sheet and including a second channel field formed through the second sheet, wherein solid portions of the first sheet act as a bottom for channels of the second channel field;

a second bi-polar plate including a) a third sheet with a third bi-polar plate channel field formed through the third sheet and b) a fourth sheet attached to the third sheet and including a fourth channel field formed through the fourth sheet;

a third bi-polar plate including a) a fifth sheet with a fifth bi-polar plate channel field formed through the fifth sheet and b) a sixth sheet attached to the fifth sheet and including a sixth channel field formed through the sixth sheet;

a fourth bi-polar plate including a) a seventh sheet with a seventh bi-polar plate channel field formed through the seventh sheet and b) an eighth sheet attached to the seventh sheet and including an eighth channel field formed through the eighth sheet;

at least one spacer attached to a perimeter portion of a second face of the first bi-polar plate and attached to a perimeter portion of the second bi-polar plate, wherein the at least one spacer is configured to form a first socket between the first bi-polar plate and the second bi-polar plate;

at least one spacer attached to a perimeter portion of a first face of the first bi-polar plate and attached to a perimeter portion of the third bi-polar plate, wherein the at least one spacer in between the first bi-polar plate and the third bi-polar plate is configured to form a second socket between the first bi-polar plate and the third bi-polar plate; and a membrane electrode assembly disposed in the first socket and a membrane electrode assembly disposed in the second socket.

17. The stack of claim 16, wherein the spacers are configured to produce a socket depth between the bi-polar plates that is less than a thickness for the membrane electrode assembly before assembly of the stack.

18. The stack of claim 17, wherein the socket depth is between about 0.7 and about 0.9 times a thickness of the membrane electrode assembly before assembly of the stack.

19. The stack of claim 16, wherein the spacers are attached to the bi-polar plates using an adhesive hydraulic sealant.

20. The stack of claim 16, wherein the spacers comprise a rigid material with an elastic modulus large enough to prevent further compression on the membrane electrode assembly once the stack is assembled.

21. The stack of claim 20, wherein the elastic modulus is greater than about 1 GPa.

22. The stack of claim of claim 16, wherein the spacers comprise a material selected from the group consisting of a metal, polymer, and ceramic.

23. A stack for use in an electrical energy generator, the stack comprising:

a first bi-polar plate including a) a first sheet with a first bi-polar plate channel field formed through the first sheet and b) a second sheet attached to the first sheet and including a second channel field formed through the second sheet, wherein channels of the first bi-polar plate channel field and the second channel field do not overlap such that solid portions of the first sheet act as a bottom for channels of the second sheet;

a second bi-polar plate including a) a third sheet with a third bi-polar plate channel field formed through the third sheet and b) a fourth sheet attached to the third sheet and including a fourth channel field formed through the fourth sheet;

a third bi-polar plate including a) a fifth sheet with a fifth bi-polar plate channel field formed through the fifth sheet and b) a sixth sheet attached to the fifth sheet and including a sixth channel field formed through the sixth sheet;

a fourth bi-polar plate including a) a seventh sheet with a seventh bi-polar plate channel field formed through the seventh sheet and b) an eighth sheet attached to the seventh sheet and including an eighth channel field formed through the eighth sheet;

at least one spacer attached to a perimeter portion of a second face of the first bi-polar plate and attached to a perimeter portion of the second bi-polar plate, wherein the at least one spacer is configured to form a first socket between the first bi-polar plate and the second bi-polar plate;

at least one spacer attached to a perimeter portion of a first face of the first bi-polar plate and attached to a perimeter portion of the third bi-polar plate, wherein the at least one spacer in between the first bi-polar plate and the third bi-polar plate is configured to form a second socket between the first bi-polar plate and the third bi-polar plate; and a membrane electrode assembly disposed in the first socket and a membrane electrode assembly disposed in the second socket.

24. The stack of claim 16, wherein the first bi-polar plate channel field comprises an anode channel field and the second channel field comprises a cathode channel field.

25. A stack for use in an electrical energy generator, the stack comprising:

a first bi-polar plate including a) a first sheet with a first bi-polar plate channel field formed through an entire thickness of the first sheet and b) a second sheet attached to the first sheet and including a second bi-polar plate channel field formed through an entire thickness of the second sheet, wherein the first bi-polar plate channel field and the second bi-polar plate channel field are oriented in a same direction and wherein the first bi-polar plate channel field is offset from the second bi-polar plate channel field;

a second bi-polar plate including a) a third sheet with a third bi-polar plate channel field formed through an entire thickness of the third sheet and b) a fourth sheet attached to the third sheet and including a fourth bi-polar plate channel field formed through an entire thickness of the fourth sheet, wherein the third bi-polar plate channel field and the fourth bi-polar plate channel field are oriented in a same direction and wherein the third bi-polar plate channel field is offset from the fourth bi-polar plate channel field; and at least one spacer attached to perimeter portion of the first bi-polar plate and attached to perimeter portion of the second bi-polar plate, wherein the at least one spacer is configured to form a socket between the first bi-polar plate and the second bi-polar plate; and a membrane electrode assembly disposed between the first bi-polar plate and the second bi-polar plate.

26. The stack of claim 25, wherein the at least one spacer is configured to produce a socket depth between the first bi-polar plate and the second bi-polar plate that is less than a thickness for the membrane electrode assembly before assembly of the stack.

27. The stack of claim 25, wherein the at least one spacer comprises a rigid material with an elastic modulus large enough to prevent further compression on the membrane electrode assembly once the stack is assembled.

28. The stack of claim 25, wherein channels of the first bi-polar plate channel field and the second bi-polar plate channel field do not overlap such that solid portions of the first sheet act as a bottom for channels of the second sheet.

29. The stack of claim 25, wherein the first bi-polar plate channel field comprises an anode channel field and the second bi-polar plate channel field comprises a cathode channel field.

30. The stack of claim 25, wherein the at least one spacer comprises a material selected from the group consisting of a metal, polymer, and ceramic.

* * * * *